United States Patent
Mansell et al.

(10) Patent No.: US 10,296,340 B2
(45) Date of Patent: May 21, 2019

(54) DATA PROCESSING APPARATUS FOR EXECUTING AN ACCESS INSTRUCTION FOR N THREADS

(71) Applicant: ARM LIMITED, Cambridge (GB)

(72) Inventors: David Hennah Mansell, Cambridge (GB); Timothy Holroyd Glauert, Cambridge (GB)

(73) Assignee: ARM Limited, Cambridge (GB)

( * ) Notice: Subject to any disclaimer, the term of this patent is extended or adjusted under 35 U.S.C. 154(b) by 508 days.

(21) Appl. No.: 14/643,018

(22) Filed: Mar. 10, 2015

(65) Prior Publication Data

US 2015/0261538 A1 Sep. 17, 2015

(30) Foreign Application Priority Data

Mar. 13, 2014 (GB) .................................. 1404492.9

(51) Int. Cl.
*G06F 9/30* (2018.01)
*G06F 9/38* (2018.01)

(52) U.S. Cl.
CPC ........ *G06F 9/3012* (2013.01); *G06F 9/30123* (2013.01); *G06F 9/3824* (2013.01); *G06F 9/3851* (2013.01)

(58) Field of Classification Search
None
See application file for complete search history.

(56) References Cited

U.S. PATENT DOCUMENTS

| | | | |
|---|---|---|---|
| 5,987,594 A | 11/1999 | Panwar et al. | |
| 6,052,775 A | 4/2000 | Panwar et al. | |
| 6,114,262 A | 9/2000 | Groh et al. | |
| 6,145,054 A | 11/2000 | Mehrotra et al. | |
| 6,148,371 A | 11/2000 | Hetherington et al. | |
| 6,148,372 A | 11/2000 | Mehrotra et al. | |

(Continued)

FOREIGN PATENT DOCUMENTS

| | | |
|---|---|---|
| CN | 102508820 | 6/2012 |
| CN | 102647588 | 8/2012 |

(Continued)

OTHER PUBLICATIONS

Search Report for GB 1404492.9, dated Oct. 7, 2014, 3 pages.
(Continued)

*Primary Examiner* — Corey S Faherty
(74) *Attorney, Agent, or Firm* — Nixon & Vanderhye P.C.

(57) ABSTRACT

A data processing apparatus 10 for executing an access instruction for n threads in order to access data values for the n threads includes storage circuitry 100 that stores data values associated with the n threads in groups defined by storage boundaries. The data processing apparatus also includes processing circuitry 80 that processes the access instruction for a set of threads at a time (where each set of threads comprises fewer than n threads) and splitting circuitry 110, responsive to the access instruction, to divide the n threads into multiple sets of threads, and to generate at least one control signal identifying the multiple sets. For each of the sets, the processing circuitry responds to the at least one control signal by issuing at least one access request to the storage circuitry in order to access the data values for that set. The splitting circuitry determines into which set each of the n threads is allocated having regards to the storage boundaries.

25 Claims, 11 Drawing Sheets

(56) References Cited

U.S. PATENT DOCUMENTS

| | | |
|---|---|---|
| 6,154,812 A | 11/2000 | Hetherington et al. |
| 6,154,815 A | 11/2000 | Hetherington et al. |
| 6,226,713 B1 | 5/2001 | Mehrotra |
| 6,269,426 B1 | 7/2001 | Hetherington et al. |
| 6,289,434 B1 | 9/2001 | Roy |
| 6,430,654 B1 | 8/2002 | Mehrotra et al. |
| 6,684,299 B2 | 1/2004 | Hetherington et al. |
| 6,903,349 B2 | 6/2005 | Mitchell et al. |
| 6,957,239 B2 | 10/2005 | Conway et al. |
| 7,447,873 B1 | 11/2008 | Nordquist |
| 7,490,218 B2 | 2/2009 | Eggers et al. |
| 7,492,368 B1 | 2/2009 | Nordquist et al. |
| 7,526,634 B1 | 4/2009 | Duluk, Jr. et al. |
| 7,581,067 B2 | 8/2009 | Johns |
| 7,584,342 B1 | 9/2009 | Nordquist |
| 7,594,095 B1 | 9/2009 | Nordquist |
| 7,600,076 B2 | 10/2009 | Johns |
| 7,624,107 B1 | 11/2009 | Le Grand |
| 7,627,723 B1 | 12/2009 | Buck et al. |
| 7,634,637 B1 | 12/2009 | Lindholm et al. |
| 7,640,284 B1 | 12/2009 | Goodnight et al. |
| 7,673,120 B2 | 3/2010 | Hoyle et al. |
| 7,680,988 B1 | 3/2010 | Nickolls et al. |
| 7,689,541 B1 | 3/2010 | Le Grand |
| 7,746,350 B1 | 6/2010 | Danilak |
| 7,747,842 B1 | 6/2010 | Goudy et al. |
| 7,788,468 B1 | 8/2010 | Nickolls et al. |
| 7,861,060 B1 | 12/2010 | Nickolls et al. |
| 7,865,894 B1 | 1/2011 | Nordquist et al. |
| 7,971,042 B2 | 6/2011 | Graham et al. |
| 7,979,683 B1 | 7/2011 | Danskin et al. |
| 7,999,808 B1 | 8/2011 | Aila et al. |
| 8,019,976 B2 | 9/2011 | Gonion et al. |
| 8,019,977 B2 | 9/2011 | Gonion et al. |
| 8,028,298 B2 | 9/2011 | Moore |
| 8,059,123 B1 | 11/2011 | Laine et al. |
| 8,060,728 B2 | 11/2011 | Gonion et al. |
| 8,065,288 B1 | 11/2011 | Garland et al. |
| 8,072,454 B1 | 12/2011 | Aila et al. |
| 8,074,224 B1 | 12/2011 | Nordquist et al. |
| 8,078,847 B2 | 12/2011 | Gonion et al. |
| 8,086,806 B2 | 12/2011 | Nyland et al. |
| 8,094,157 B1 | 1/2012 | Le Grand |
| 8,095,782 B1 | 1/2012 | Danskin et al. |
| 8,106,916 B1 | 1/2012 | Danilak |
| 8,108,625 B1 | 1/2012 | Coon et al. |
| 8,112,614 B2 | 2/2012 | Nickolls et al. |
| 8,117,389 B2 | 2/2012 | Johns |
| 8,176,265 B2 | 5/2012 | Coon et al. |
| 8,190,807 B2 | 5/2012 | Reid et al. |
| 8,200,940 B1 | 6/2012 | Lindholm |
| 8,200,947 B1 | 6/2012 | Nickolls et al. |
| 8,212,816 B1 | 7/2012 | Hoberock et al. |
| 8,214,625 B1 | 7/2012 | Nickolls et al. |
| 8,218,003 B2 | 7/2012 | Tan et al. |
| 8,219,371 B1 | 7/2012 | Le Grand |
| 8,219,372 B1 | 7/2012 | Le Grand |
| 8,219,763 B2 | 7/2012 | Johns |
| 8,219,993 B2 | 7/2012 | Johnson et al. |
| 8,224,635 B1 | 7/2012 | Le Grand |
| 8,243,083 B1 | 8/2012 | Garland et al. |
| 8,250,549 B2 | 8/2012 | Reid et al. |
| 8,261,042 B2 | 9/2012 | Kanstein et al. |
| 8,266,382 B1 | 9/2012 | Minkin et al. |
| 8,266,383 B1 | 9/2012 | Minkin et al. |
| 8,271,763 B2 | 9/2012 | Nickolls et al. |
| 8,302,098 B2 | 10/2012 | Johnson et al. |
| 8,312,254 B2 | 11/2012 | Coon et al. |
| 8,321,849 B2 | 11/2012 | Nickolls et al. |
| 8,335,892 B1 | 12/2012 | Minkin et al. |
| 8,364,739 B2 | 1/2013 | Baskaran et al. |
| 8,375,176 B2 | 2/2013 | Coon et al. |
| 8,384,736 B1 | 2/2013 | Lindholm et al. |
| 8,392,463 B2 | 3/2013 | Gautam et al. |
| 8,392,669 B1 | 3/2013 | Nyland et al. |
| 8,402,255 B2 | 3/2013 | Gonion et al. |
| 8,458,440 B2 | 6/2013 | Shebanow |
| 8,468,547 B2 | 6/2013 | Lefebvre et al. |
| 8,484,418 B2 | 7/2013 | Chishti et al. |
| 2007/0011442 A1 | 1/2007 | Hussain |
| 2007/0074004 A1 | 3/2007 | Wong et al. |
| 2007/0143582 A1 | 6/2007 | Coon et al. |
| 2007/0219771 A1 | 9/2007 | Verheyen et al. |
| 2007/0220212 A1 | 9/2007 | Johns |
| 2007/0271556 A1 | 11/2007 | Eggers et al. |
| 2008/0098207 A1 | 4/2008 | Reid et al. |
| 2008/0098208 A1 | 4/2008 | Reid et al. |
| 2008/0109795 A1 | 5/2008 | Buck et al. |
| 2009/0006824 A1 | 1/2009 | Johns |
| 2009/0154690 A1 | 6/2009 | Wu |
| 2009/0323784 A1 | 12/2009 | Depienne et al. |
| 2009/0324041 A1 | 12/2009 | Narayanan et al. |
| 2009/0326363 A1 | 12/2009 | Li et al. |
| 2010/0064291 A1 | 3/2010 | Aila et al. |
| 2010/0070502 A1 | 3/2010 | Zigon |
| 2010/0070904 A1 | 3/2010 | Zigon et al. |
| 2010/0070956 A1 | 3/2010 | Leung et al. |
| 2010/0076941 A1 | 3/2010 | Dotsenko et al. |
| 2010/0106758 A1 | 4/2010 | Govindaraju et al. |
| 2010/0126988 A1 | 5/2010 | MacKay et al. |
| 2010/0218196 A1 | 8/2010 | Leung et al. |
| 2010/0259536 A1 | 10/2010 | Toksvig et al. |
| 2011/0055511 A1 | 3/2011 | Mantor et al. |
| 2011/0067016 A1 | 3/2011 | Mizrachi et al. |
| 2011/0072213 A1 | 3/2011 | Nickolls et al. |
| 2011/0072248 A1 | 3/2011 | Nickolls et al. |
| 2011/0072249 A1 | 3/2011 | Nickolls et al. |
| 2011/0074802 A1 | 3/2011 | Nickolls et al. |
| 2011/0078225 A1 | 3/2011 | Johnson et al. |
| 2011/0078367 A1 | 3/2011 | Minkin et al. |
| 2011/0078381 A1 | 3/2011 | Heinrich et al. |
| 2011/0078415 A1 | 3/2011 | Johnson et al. |
| 2011/0078417 A1 | 3/2011 | Fahs et al. |
| 2011/0078418 A1 | 3/2011 | Rozas et al. |
| 2011/0078427 A1 | 3/2011 | Shebanow et al. |
| 2011/0078689 A1 | 3/2011 | Shebanow et al. |
| 2011/0078690 A1 | 3/2011 | Fahs et al. |
| 2011/0078692 A1 | 3/2011 | Nickolls et al. |
| 2011/0080406 A1 | 4/2011 | Hakura et al. |
| 2011/0082877 A1 | 4/2011 | Gupta et al. |
| 2011/0082961 A1 | 4/2011 | Minkin et al. |
| 2011/0161642 A1 | 6/2011 | Eichenberger et al. |
| 2011/0161643 A1 | 6/2011 | Eichenberger et al. |
| 2011/0171619 A1 | 7/2011 | Sweeney |
| 2011/0179252 A1 | 7/2011 | Master et al. |
| 2011/0182491 A1 | 7/2011 | Levin et al. |
| 2011/0185328 A1 | 7/2011 | Roy et al. |
| 2011/0307663 A1 | 12/2011 | Kultursay et al. |
| 2011/0320883 A1 | 12/2011 | Gonion et al. |
| 2012/0017062 A1 | 1/2012 | Goel et al. |
| 2012/0050303 A1 | 3/2012 | McAllister et al. |
| 2012/0066668 A1 | 3/2012 | Buck et al. |
| 2012/0081373 A1 | 4/2012 | Li et al. |
| 2012/0084539 A1 | 4/2012 | Nyland et al. |
| 2012/0089792 A1 | 4/2012 | Fahs et al. |
| 2012/0089812 A1 | 4/2012 | Smith |
| 2012/0092352 A1 | 4/2012 | Mallick et al. |
| 2012/0110586 A1 | 5/2012 | Coon et al. |
| 2012/0131309 A1 | 5/2012 | Johnson et al. |
| 2012/0143915 A1 | 6/2012 | Gupta et al. |
| 2012/0151145 A1 | 6/2012 | Lyashevsky |
| 2012/0177119 A1 | 7/2012 | Dwarakapuram et al. |
| 2012/0185228 A1 | 7/2012 | Johns |
| 2012/0188258 A1 | 7/2012 | McCrary et al. |
| 2012/0191953 A1 | 7/2012 | Eichenberger et al. |
| 2012/0192167 A1 | 7/2012 | Eichenberger et al. |
| 2012/0198214 A1 | 8/2012 | Gadre et al. |
| 2012/0198458 A1 | 8/2012 | Hartog et al. |
| 2012/0200576 A1 | 8/2012 | Hartog et al. |
| 2012/0203985 A1 | 8/2012 | Fossum |
| 2012/0210081 A1 | 8/2012 | Fossum |
| 2012/0221808 A1 | 8/2012 | Coon et al. |
| 2012/0239909 A1 | 9/2012 | Nickolls et al. |
| 2013/0014118 A1 | 1/2013 | Jones |

(56) References Cited

U.S. PATENT DOCUMENTS

| | | |
|---|---|---|
| 2013/0016109 A1 | 1/2013 | Garanzha |
| 2013/0019053 A1 | 1/2013 | Somanache et al. |
| 2013/0042090 A1 | 2/2013 | Krashinsky |
| 2013/0044924 A1 | 2/2013 | Spencer |
| 2013/0046951 A1 | 2/2013 | Jones |
| 2013/0067138 A1 | 3/2013 | Schuette et al. |
| 2013/0117541 A1 | 5/2013 | Choquette et al. |
| 2013/0125097 A1 | 5/2013 | Ebcioglu et al. |
| 2013/0132684 A1 | 5/2013 | Ostrovsky et al. |
| 2013/0138926 A1 | 5/2013 | Coon et al. |
| 2013/0141444 A1 | 6/2013 | Gautam et al. |
| 2013/0141447 A1 | 6/2013 | Hartog et al. |
| 2013/0155077 A1 | 6/2013 | Hartog et al. |
| 2013/0159664 A1 | 6/2013 | Blinzer et al. |
| 2013/0160019 A1 | 6/2013 | Hartog et al. |
| 2013/0160021 A1 | 6/2013 | Purcell et al. |
| 2013/0166881 A1 | 6/2013 | Choquette et al. |
| 2013/0166886 A1 | 6/2013 | Sasanka et al. |
| 2013/0179662 A1 | 7/2013 | Choquette et al. |
| 2013/0185728 A1 | 7/2013 | Abdalla et al. |
| 2013/0191817 A1 | 7/2013 | Vorbach |
| 2013/0198479 A1 | 8/2013 | Jones et al. |
| 2013/0198480 A1 | 8/2013 | Jones et al. |
| 2013/0232322 A1 | 9/2013 | Fetterman et al. |

FOREIGN PATENT DOCUMENTS

| | | |
|---|---|---|
| WO | WO 2012/009252 | 1/2012 |
| WO | WO 2012/087561 | 6/2012 |
| WO | WO 2013/033651 | 3/2013 |
| WO | WO 2013/048497 | 4/2013 |
| WO | WO 2013/048500 | 4/2013 |
| WO | WO 2013/048503 | 4/2013 |
| WO | WO 2013/081975 | 6/2013 |
| WO | WO 2013/095385 | 6/2013 |
| WO | WO 2013/095401 | 6/2013 |
| WO | WO 2013/095404 | 6/2013 |
| WO | WO 2013/095437 | 6/2013 |

OTHER PUBLICATIONS

Lashgar et al., "Dynamic Warp Resizing: Analysis and Benefits in High-Performance SIMT", IEEE, 2012, pp. 502-503.

"How to Access Global Memory Efficiently in CUDA C/C ++ Kernels", https://developer.nvidia.com/content/how-access-global-memory-efficiently-cuda-cc-kernels , 7 pages, Mar. 10, 2015.

| LANE | SET 1 | SET 2 |
| --- | --- | --- |
| 0 | 4 | 0 |
| 1 | 5 | 1 |
| 2 | 2 | 6 |
| 3 | 3 | 7 |

| LANE | SET 1 | SET 2 | SET 3 | SET 4 |
|---|---|---|---|---|
| 0 | 4 | 8 | 12 | 0 |
| 1 | 5 | 9 | 13 | 1 |
| 2 | 2 | 6 | 10 | 14 |
| 3 | 3 | 7 | 11 | 15 |

```
                                    BIT 4
                                     ↓
    0x2038  →  0010   0000   001│1│  1000  ⎫
    0x203C  →  0010   0000   001│1│  1100  ⎪  USED
 →  0x2040  →  0010   0000   010│0│  0000  ⎬  FOR
    0x2044  →  0010   0000   010│0│  0100  ⎪  ADDRESS
    0x2048  →  0010   0000   010│0│  1000  ⎭  COMPARISON
    0x204C  →  0010   0000   010│0│  1100
    0x2050  →  0010   0000   010│1│  0000
    0x2054  →  0010   0000   010│1│  0100
```

DATA PROCESSING APPARATUS FOR EXECUTING AN ACCESS INSTRUCTION FOR N THREADS

This application claims priority to GB Patent Application No. 1404492.9 filed 13 Mar. 2014, the entire contents of which is hereby incorporated by reference.

BACKGROUND

1. Field

The present invention relates to a data processing apparatus. In particular, the present invention has relevance to data processing apparatuses that execute an access instruction for a plurality of threads.

2. Description

In a Single Instruction Multiple Thread (SIMT) system, a group of threads is said to execute in parallel. Each thread within the group may have its own registers and program counter, and may execute the same program. If each thread has its own registers, then at least a subset of those threads may execute the same instruction on different data values. Although the execution of the threads in a group is said to take place in parallel, the number of threads that can actually execute said instruction at the same time may be smaller than the number of threads in the group. Accordingly, the threads in a particular group may have to be divided up into a number of sets, with each set of threads executing the instruction substantially simultaneously.

U.S. Pat. No. 8,392,669 describes a method (herein referred to as 'peeling') of improving the efficiency of simultaneous memory access requests. Ordinarily, a memory access request will be issued in order to service a single thread. However, by configuring the memory circuitry to return more data than a particular thread requests, it is possible to use a single memory access request to additionally return data that is requested by other threads. For example, if a memory access request from a first thread is directed towards a data value at a memory base address, the memory circuitry may be configured to return data values stored at the base address as well as data values stored at the addresses following the base address if those data values will service the memory access requests of other threads.

Data values may be stored in groups defined by storage boundaries. For example, a cache stores data values in fixed sized groups known as cache lines. In such a situation, if the base address for a group of threads is not aligned with the storage boundary, then the process of peeling, in combination with the previously mentioned division of threads in a group into sets, may cause multiple memory access requests to be issued unnecessarily. For example, a single cache line may be accessed more than once.

SUMMARY

In accordance with a first example configuration there is provided a data processing apparatus for executing an access instruction for n threads in order to access data values for the n threads, the data processing apparatus comprising: storage circuitry configured to store data values associated with the n threads in groups defined by storage boundaries; processing circuitry configured to process the access instruction for a set of threads at a time, where each set of threads comprises fewer than n threads; and splitting circuitry configured, responsive to the access instruction, to divide the n threads into multiple sets of threads, and to generate at least one control signal identifying the multiple sets; wherein, for each of the sets of threads, the processing circuitry is configured to be responsive to the at least one control signal to issue at least one access request to the storage circuitry in order to access the data values for that set of threads; and wherein the splitting circuitry is configured to determine into which set each of the n threads is allocated having regards to the storage boundaries.

According to a second example configuration there is provided a data processing method for executing an access instruction for n threads in order to access data values for the n threads, wherein the data values for the n threads are stored in groups defined by storage boundaries, the data processing method comprising the steps: dividing the n threads into multiple sets of threads, wherein each set of threads comprises fewer than n threads; generating at least one control signal identifying the multiple sets; and for each of the sets of threads, issuing in response to the at least one control signal at least one access request in order to access the data values for that set of threads, wherein the allocation of the n threads into the multiple sets of threads is made having regards to the storage boundaries.

According to a third example configuration there is provided a data processing means for executing an access instruction for n threads in order to access data values for the n threads, the data processing means comprising: storage means for storing data values associated with the n threads in groups defined by storage boundaries; processing means for processing the access instruction for a set of threads at a time, where each set of threads comprises fewer than n threads; and splitting means for dividing, in response to the instruction, the n threads into multiple sets of threads, and for generating at least one control signal identifying the multiple sets, wherein, for each of the sets of threads, the processing means for issuing, responsive to the at least one control signal, at least one access request to the storage means in order to access the data values for that set of threads; and wherein the splitting means are for determining into which set each of the n threads is allocated having regards to the storage boundaries.

The above, and other objects, features and advantages of this disclosure will be apparent from the following detailed description of illustrative embodiments which is to be read in connection with the accompanying drawings.

BRIEF DESCRIPTION OF THE DRAWINGS

Embodiments will now be described, by way of example only, with reference to the Figures, in which.

Figure 1:
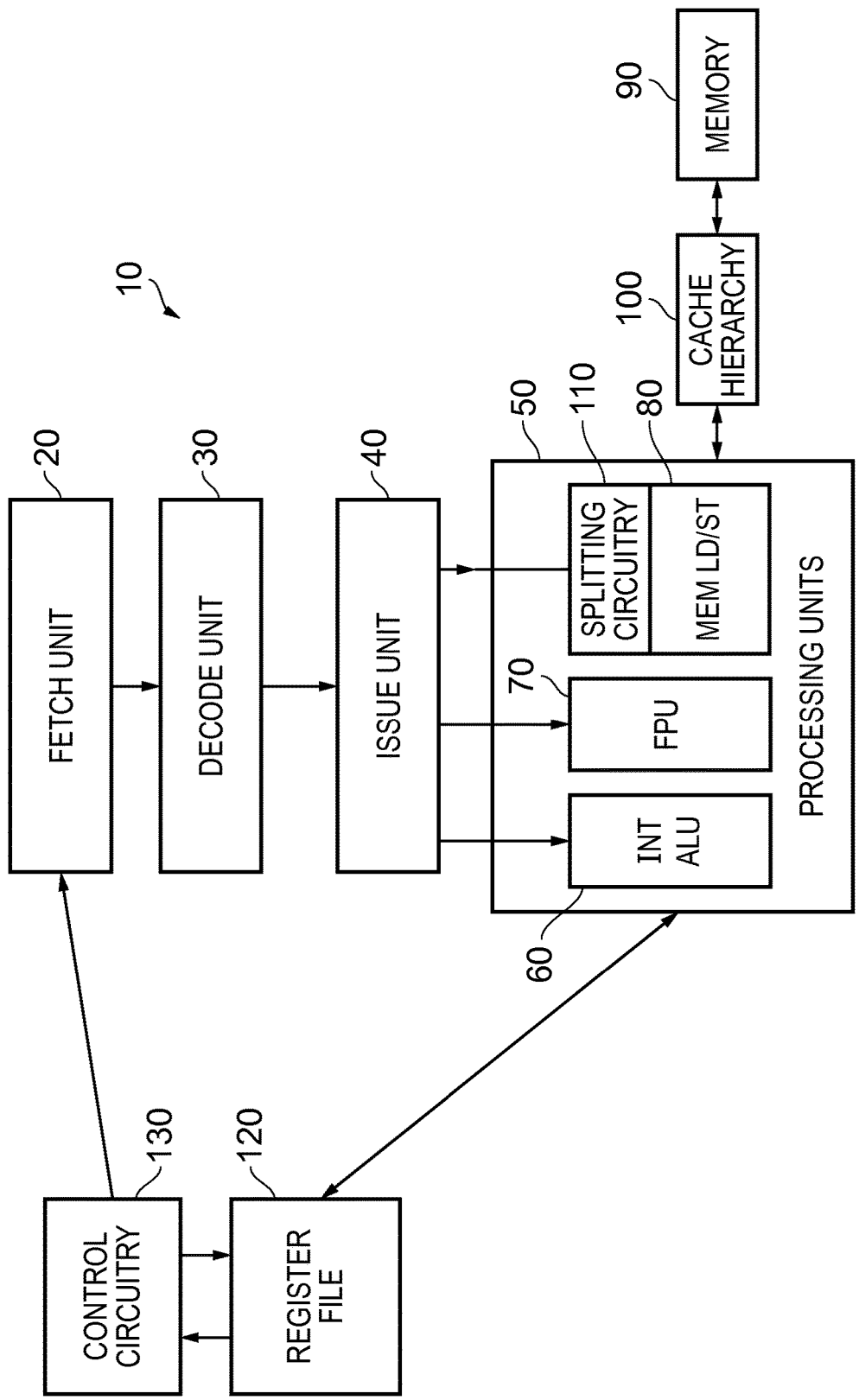
FIG. 1 schematically shows a data processing apparatus according to one embodiment.

The Figures will now be discussed in more detail.

DESCRIPTION OF EXAMPLE EMBODIMENTS

Before discussing the embodiments with reference to the accompanying figures, the following description of embodiments and associated advantages is provided.

In accordance with a first example configuration there is provided a data processing apparatus for executing an access instruction for n threads in order to access data values for the n threads, the data processing apparatus comprising: storage circuitry configured to store data values associated with the n threads in groups defined by storage boundaries; processing circuitry configured to process the access instruction for a set of threads at a time, where each set of threads comprises fewer than n threads; and splitting circuitry configured, responsive to the access instruction, to divide the n threads into multiple sets of threads, and to generate at least one control signal identifying the multiple sets; wherein, for each of the sets of threads, the processing circuitry is configured to be responsive to the at least one control signal to issue at least one access request to the storage circuitry in order to access the data values for that set of threads; and wherein the splitting circuitry is configured to determine into which set each of the n threads is allocated having regards to the storage boundaries.

The data processing device described in the preceding paragraph executes an access instruction for n threads. However, the processing circuitry of the data processing apparatus processes the access instruction for a set of threads (smaller than and selected from the n threads) at a time. It is therefore necessary to divide the n threads into multiple sets of threads. By dividing the n threads into multiple sets of threads having regard to storage boundaries of the storage circuitry that stores the data for the threads (i.e. by determining into which set each of the n threads is allocated having regards to the storage boundaries of the storage circuitry), it is often possible to reduce the instances of multiple memory access requests being issued unnecessarily. In particular, it may become less likely that it is necessary to issue multiple memory access requests to retrieve all of the data values stored in a single group defined by storage boundaries. Hence, in accessing the data for the n threads, a smaller number of access requests may need to be issued than in accordance with prior art techniques, leading to a more efficient utilisation of components with the processing circuitry (such as a load/store unit) and thereby leading to a more efficient data processing apparatus.

The splitting circuitry may be configured to determine into which set each of the n threads is allocated in order to seek to reduce (typically by seeking to minimise) a total number of access requests issued by the processing circuitry when processing the access instruction for each of the n threads. The minimisation of the total number of access requests issued by the processing circuitry may be as compared to the number of access requests issued when not considering the storage boundaries when determining into which set each of the n threads is allocated. In some embodiments, the minimisation may be compared to all possible divisions of the n threads into sets.

The division of the n threads into sets of threads may be performed such that exactly one access request is issued to the storage circuitry for at least one of the sets of threads. Hence, a number of access requests can be satisfied by issuing only a single access request to the storage circuitry.

The data processing apparatus is particularly advantageous when the storage circuitry comprises at least one cache and when the storage boundaries are defined by cache line boundaries. Typically, a cache line may store a number of different data values. If a single cache line stores data values that relate to multiple access requests, then the data processing apparatus may issue a single request that satisfies all the threads in the set that request data stored in that cache line. In some situations, it may be possible to divide n threads into sets of threads, i.e. to select sets of threads, such that the data values for at least one set of threads resides in exactly one cache line of the at least one cache. Hence, a single access request may be issued in relation to a set of threads, causing the entire cache line to be returned and thereby satisfy the access requests from all of the threads in that set. By dividing the n threads into sets of threads such that the data values for at least one set of threads are all on the same cache line, it may be possible to reduce the number of occasions in which the same cache line must be accessed more than once in order to access all the requested data. Consequently, the efficiency and utilisation of the load/store unit can be improved.

There are a number of ways in which each set of threads may be picked or selected from the n threads. The splitting circuitry may be configured to determine a split point in the n threads, the split point being selected based on, or having regards to, the storage boundaries. The n threads may then be divided into sets of m threads based on this split point (i.e. with each set of threads comprising m threads, where m<n). Since the split point is chosen based on knowledge of the storage boundaries, it is possible to choose a split point that will then cause the threads to be allocated into the sets in a manner that aims to reduce the overall number of access requests that need to be issued. By merely considering a split point, it may be possible to divide the n threads into sets of m threads very simply using a small amount of circuitry, thereby keeping the size of the data processing apparatus small. Furthermore, the splitting circuitry may be able to operate using a small amount of energy.

In some embodiments, the splitting circuitry may be configured to divide the n threads into sets of m threads by allocating, into one of the sets of m threads, m consecutive threads from the n threads starting from a thread associated with the split point. In other words, if a particular thread is associated with a split point, then that thread and the (m−1) threads immediately following it may make up a first set of m threads. Such a mechanism of dividing threads may be implemented in hardware using a small number of hardware components. This may lead to a low energy expenditure when splitting threads into sets.

The splitting circuitry may allocate, into one of the sets of m threads, one or more threads immediately preceding a thread associated with the split point and one or more threads immediately following a further set of m consecutive threads. The further set is typically the final set of threads that can be made up from m consecutive threads. In this manner, one of the sets of m threads may be made up of "offcuts" or threads that are left over from dividing the n threads into one or more sets of m consecutive threads.

A number of different control signals may be generated by the splitting circuitry and received by the processing circuitry. However, in some embodiments, the at least one control signal comprises data corresponding to the split point. Hence, the at least one control signal may identify the multiple sets by providing only a split point. The sets of threads may therefore be identified without transferring large amounts of control data between circuits, which would increase the energy consumption of the data processing apparatus. In other embodiments, the splitting circuitry may generate a different control signal for each set of m threads.

For each of the n threads each instruction may provide an address of a location in the storage circuitry where the data value for that thread is located. The splitting circuitry may be configured to predict a split point based on a value of a predefined bit of the address provided for at least a subset of the n threads. Since the decision of how to divide the n threads into sets of m threads is made having regards to the storage boundaries, predicting the split point based on the address may enable an alignment between sets of threads and storage boundaries.

Each of the n threads may have an associated identifier and the threads may be ordered according to that associated identifier, with a thread zero having the lowest associated identifier. The identifier may be, for example, a "thread ID" that uniquely identifies each thread. In some embodiments, the address of the location in the storage circuitry where the data value for a thread is located increases in dependence on the associated identifier for that thread. Similarly, in other embodiments, the address of the location in the storage circuitry where the data value for a thread is located may decrease in dependence on the associated identifier for that thread.

There are a number of ways in which the split point may be predicted. Initially, the predicted split point may be associated with the thread zero. Selecting a split point that is associated with the thread zero causes the threads to be split into sets in a non-offset manner. The default (initial) split point is associated with thread zero, since this will result in a non-offset split occurring. Such a split may reduce the chances of predicting an incorrect split point, which may result in an increase in the number of memory access requests being issued. Furthermore, "offcuts" may be avoided. For example, it may be possible to avoid a set of m threads comprising m non-consecutive threads.

The splitting circuitry may be configured to predict the split point by comparing the predefined bit in the address provided for adjacent pairs of threads. For example, in response to determining that no adjacent pair formed from the first m of the n threads provides addresses having different predefined bits, the splitting circuitry may be configured to predict the split point as associated with the thread zero. In response to determining that exactly one adjacent pair formed from the first m of the n threads provides addresses having different predefined bits, the splitting circuitry may be configured to predict the split point as associated with one of the threads in the exactly one adjacent pair. In response to determining that more than one adjacent pair formed from the first m of the n threads provides addresses having different predefined bits, the splitting circuitry may be configured to predict the split point as associated with the thread zero. The above are just three example use cases, and other examples may be used, dependent on the embodiment. Further, it will be appreciated that different examples may be used in isolation or in any combination thereof.

The splitting circuitry may comprise a split point cache and the split point may be determined based on the split point cache. In other words, the split point cache may be consulted in order to determine what the split point should be. The splitting circuitry may not always have all the necessary information in order to best predict where a split point should be. Similarly, a split point that initially appears to be suitable may turn out to be sub-optimal. Furthermore, the repeated calculation of a split point may be both time consuming and inefficient. By using a split point cache, the data processing apparatus is able to re-use and refine previous predictions of split points.

The split point cache may have a number of entries each of which is configured to store a split point in association with a program counter value. Accordingly, where the same sequence of instructions is repeated, it may be possible to use the split point cache such that the split point for a particular instruction of the program need only be calculated once. It will be appreciated that the split point cache may comprise a number of different split points, each for a different instruction in the program. By storing the different split points associated with different instructions in the program (i.e. the program counter value of each instruction), it may be possible to select the most appropriate split point for a particular instruction.

The split point cache may be populated based on the number of access requests issued to the storage circuitry in order to access, for each set of m threads, the data values for the m threads. Accordingly, split points that generate small numbers of access requests when used, may be used to populate the split point cache.

In one example, in the absence of a hit being detected in the split point cache, the splitting circuitry may be configured to associate the split point with thread zero when dividing the n threads into sets of m threads. For a first set of m threads, the splitting circuitry may then be configured to generate a predicted split point based on a value of a predefined bit of the address and then to populate the split point cache with the predicted split point if the number of access requests issued by the processing circuitry in order to access the data values for the first set of m threads is consistent with the predicted split point. The initial split point associated with thread zero may be used in order to fetch the addresses associated with the first m of the n threads. Thereafter, the addresses may be analysed to determine a predicted split point. If the number of access requests that are then issued using the initial split point are what would be expected, given the predicted split point, the split point cache may then be populated with an entry for the program counter value, identifying the predicted split point. When the same instruction is next executed, there will now be a hit in the cache which should provide a more optimum split point.

In some embodiments, the split point cache is only populated if the number of access requests that are issued is exactly two, in order to access the data values corresponding with the first m of the n threads. One explanation for issuing two access requests for m threads is that addresses associated with the m threads cross a storage boundary. The point at which this happens may correspond with the predicted split point, such that a future division based on the predicted split point will cause a set of m threads to be aligned with the storage boundaries, thereby reducing the number of access requests to be issued. It may be desirable to not store split points in the cache where the resulting number of access requests in accordance with the above process is one, since this would involve adding entries to the split point cache where the default split point (i.e. corresponding to thread zero) already produces the minimal number of access requests (i.e. one). Similarly, it may be desirable to not store split points in the cache where the resulting number of access requests in accordance with the above process is more than two, since this would involve adding entries to the split point cache where the computed split point is not necessarily an improvement over the default split point of zero.

Each entry of the split point cache may be configured to store a confidence value in association with the split point stored for that entry. The confidence value may represent, for example, the degree with which a particular split point is believed to be correct. The confidence value for a particular split point may be increased in response to generating a small number of access requests using that split point. The confidence value for a particular split point may also be reduced in response to a large number of access requests being generated in response to using that particular split point. Suitable techniques and algorithms for calculating and adjusting the split point will be apparent to the skilled person and will be discussed later with reference to the specific embodiments.

The splitting circuitry may comprise feedback circuitry configured to adjust the confidence value for a particular split point based on the at least one access request. For example, the confidence value may be reduced in response to a large number of access requests being generated by using the associated split point. Alternatively, the confidence value may be increased if a low number of access requests is generated as a result of using the split point.

The data processing apparatus may be configured to execute access instructions from one or more thread groups, each thread group comprising one or more threads. One of the thread groups may also comprise the n threads.

Particular embodiments will now be described with reference to the figures.

FIG. 1 schematically shows a data processing apparatus 10 according to one embodiment that comprises a fetch unit 20. The fetch unit 20 is configured to fetch an instruction to be executed for a plurality of threads in a particular thread group. This instruction is then passed to the decode unit 30, which decodes the instruction and generates one or more control signals corresponding to the decoded instruction which are sent to the issue unit 40. On receiving the control signals, the issue unit 40 is configured to determine which of the processing units 50 should be used to respond to the control signals corresponding to the decoded instruction. The processing units 50 may be made up from a variety of different circuits and may include, for example, an integer Arithmetic Logic Unit (ALU) 60 for handling integer arithmetic, a Floating Point Unit (FPU) 70 for handling operations on floating point numbers, and a memory load/store unit 80 for accessing data held in a memory 90 (e.g. to load data values from memory into registers of the register file or to store data values from registers of the register file back to memory). A cache hierarchy 100 may be located between the memory load/store unit 80 and the memory 90 and may be used to cache frequently or recently accessed data values from the memory 90 (for the purposes of the present application cache hierarchy 100 and/or memory 90 will be referred to as storage circuitry). Each of the processing units 50 may be capable of operating on multiple threads simultaneously or substantially simultaneously. For example, each of the processing units 50 may comprise a number of lanes. In this example embodiment, the memory load/store unit 80 is considered to comprise m lanes (m<n). In other embodiments, each of the processing units may have the same number of lanes, or may have different numbers of lanes. Threads may be allocated to lanes in a processing unit and a single operation may be performed on each lane simultaneously. In this way, for a group of n threads, a single operation may be carried out on all of those n threads by iteratively selecting sets of m (out of the n threads) to be processed in parallel. The n threads must therefore be split into n/m (rounded up) sets of m threads. Note that in some embodiments, m will be a factor of n and so no rounding will be required.

The data processing apparatus 10 additionally comprises splitting circuitry 110. In this embodiment, the splitting circuitry 110 is shown as being part of the memory load/store unit 80. However, it will be appreciated by the skilled person that the splitting circuitry 110 could be a separate component. Additionally, each of the FPU 70 or the integer ALU 60 may also have splitting circuitry, either as an integrated or separate component. Still furthermore, a single splitting circuitry may be provided for each of the processing units 50.

A register file 120 is used to store values for each of the threads in each thread group. A representation of part of the register file is shown in more detail in FIG. 2.

The data processing apparatus 10 also comprises control circuitry 130, which interacts with the register file 120 in order to determine which thread group should be next to execute and which instruction threads within that thread group should execute. This information is transmitted to the fetch unit 20 in order to enable the fetch unit to fetch the instruction to be executed.

Figure 2:
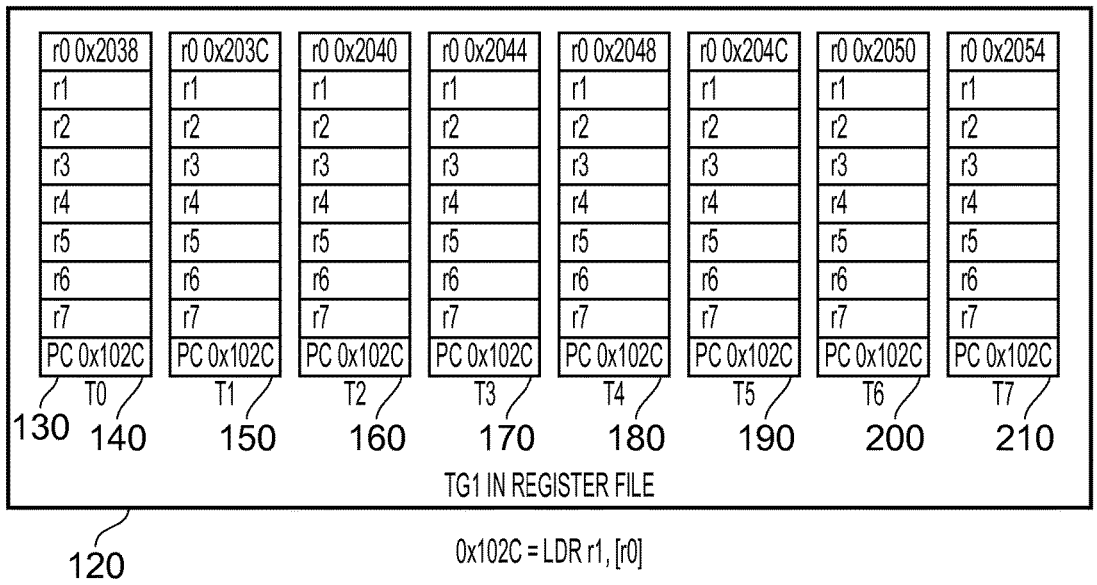
FIG. 2 shows a representation of a part of the register file of FIG. 1.

FIG. 2 shows a representation of part of the register file 120. In particular, FIG. 2 shows banks of registers 140, 150, 160, 170, 180, 190, 200, 210 that correspond to eight threads (T0 to T7) that make up a single thread group TG1. Each of the register banks 140, 150, 160, 170, 180, 190, 200, 210 comprises eight registers (r0 to r7) plus a program counter 130. In this example, the program counter 130 of each register bank contains the value 0x102C and therefore each of the threads T0 to T7 is due to issue the instruction held at instruction address 0x102C. FIG. 2 shows that the instruction held at address 0x102C is: LDR r1, [r0]. This instruction causes the memory address stored in register r0 to be accessed and causes the value stored in the memory address to be placed in register r1. As shown in FIG. 2, each of the register banks for the threads T0 to T7 has a different value in register r0. Accordingly, each of the threads T0 to T7 will access a different memory address and so load different data value into their register r1. Although FIG. 2 shows the program counter as forming part of each of the register banks, the program counter may also be formed as part of a separate special block and may fall outside the register file 120 entirely.

It will be understood by the skilled person that although FIG. 2 shows the register file as having a completely separate register bank 140, 150, 160, 170, 180, 190, 200, 210 for each of the threads T0 to T7, it may also be the case that the register file comprises a smaller number of register banks comprising a larger number of registers, with subsets of registers in a particular register bank relating to a particular thread. For example, a single register bank may comprise registers r0 to r7 for a thread T0 and registers r0 to r7 for a thread T4. A second register bank may comprise registers r0 to r7 for a thread T1 and registers r0 to r7 for a thread T5, etc. See, for example, FIG. 11. Other combinations are of course possible.

Figure 3:
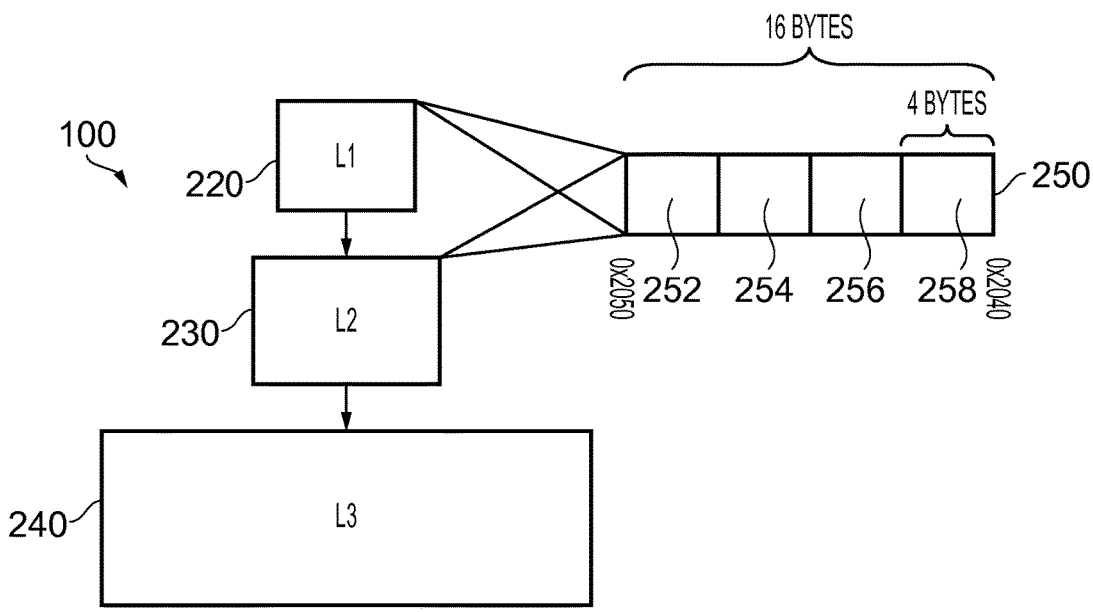
FIG. 3 shows a representation of a cache hierarchy which may comprise one or more cache lines.

FIG. 3 shows an example of the cache hierarchy 100, which may be made up from a number of separate caches. In this example, a level one cache 220 is provided together with a level two cache 230 and level three cache 240. As the level of the cache increases, the size of the cache also increases, i.e. the number of data values stored in the cache also increase. However, the time taken to access a higher level cache versus a lower level cache is greater. Each of the caches 220, 230, 240 that make up the cache hierarchy 100 may comprise one or more cache lines 250. Cache lines are of a fixed size. In this example, the cache line 250 is 16 bytes in length. Furthermore, it is often the case that a cache line stores multiple data values. In this example, the cache line 250 comprises four data values 252, 254, 256, 258, each of four bytes in length. If a particular data value 254 is requested by the memory load/store unit 80, then the entire cache line 250 must be accessed in the cache hierarchy 100 in order to return the values stored there. The cache hierarchy 100 intermediates the memory 90 and the memory load store unit 80. If the memory load store unit 80 requests data from memory that is held in one of the caches 220, 230, 240 that make up the cache hierarchy 100, then the value will be returned from the cache hierarchy 100 rather than from memory 90. Accessing data from the cache hierarchy 100 is quicker than accessing memory 90, and therefore frequently accessed or recently accessed data values can be accessed more quickly as a result of the cache hierarchy 100. The process of 'peeling' recognises that it may not be any more time consuming (or possibly only slightly more time consuming) to return the entirety of a cache line 250 rather than a single value 254 stored within the cache line 250. By returning the entire cache line 250, it may be possible to satisfy multiple threads that request access to data in the same cache line 250 in a single operation.

Figure 4:
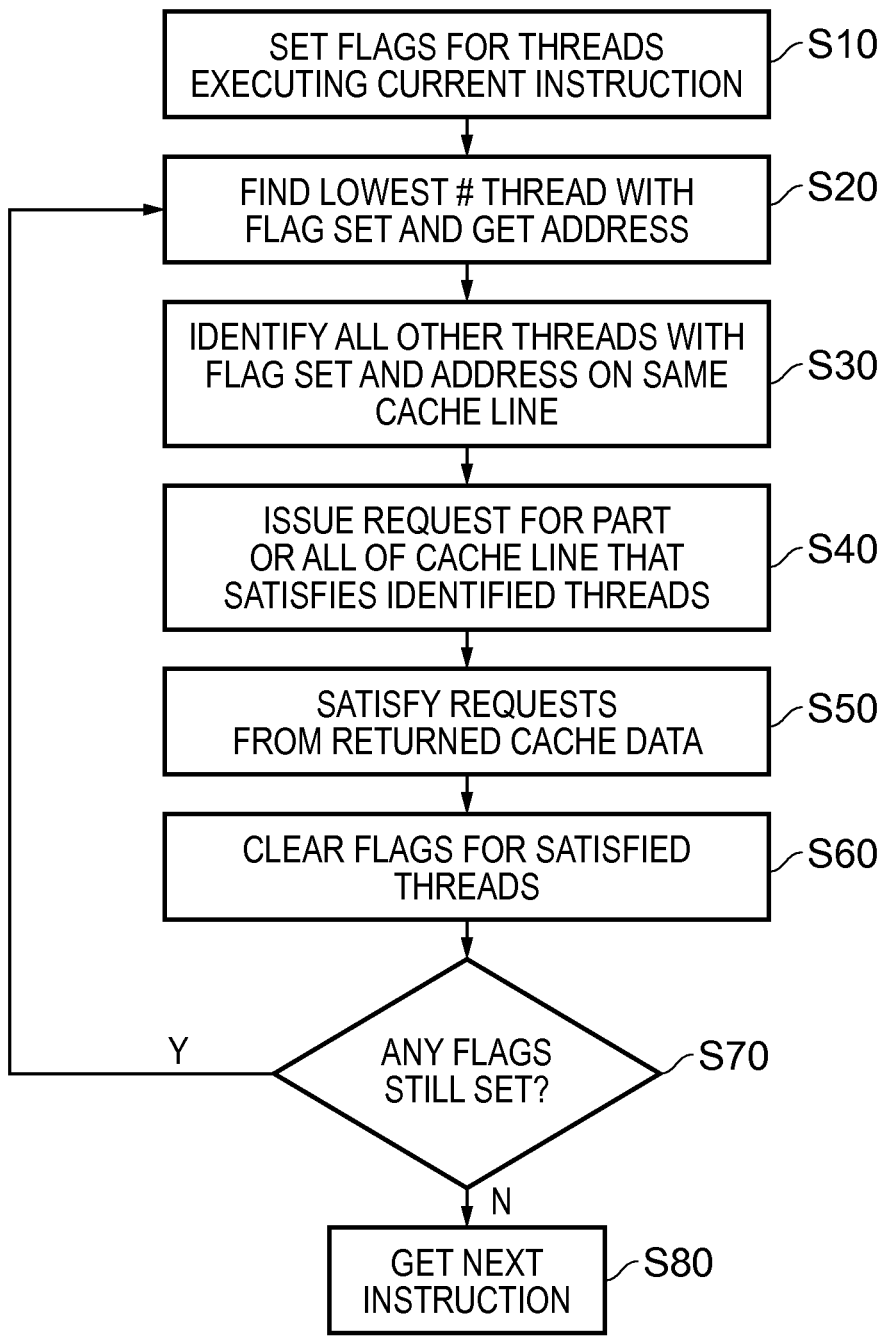
FIG. 4 is a flowchart showing an example of peeling.

FIG. 4 is a flowchart showing the process of 'peeling'. The process begins at step S10, in which flags are set for the threads that are due to execute the current instruction. At step S20, the lowest numbered thread with a flag still set is determined and the address to which that thread is referring is determined. At step S30, other threads that have the flag set and have an address on the same cache line are identified. At step S40 a single memory access request is issued which is large enough to satisfy all the threads identified in the previous step. The data requested by those threads is then returned by the cache. At step S50, the requests from the identified threads are then satisfied. In particular, data requested by the threads that lies on the returned cache line is stored in the register requested by the thread. At step S60, threads that were satisfied have their flags cleared. At step S70, if there are any flags still set, then the flow returns to step S20 where the lowest numbered thread with a flag still set is determined and the address to which that thread is referring is determined. If, at step S70, there are no flags still set then, at step S80, the peeler is ready to handle the next instruction.

Consequently, it may not be necessary to issue multiple access requests, i.e. one for each thread. Instead it may be possible to issue a smaller number of access requests, with each access request returning a cache line that satisfies multiple threads simultaneously.

Figure 5:
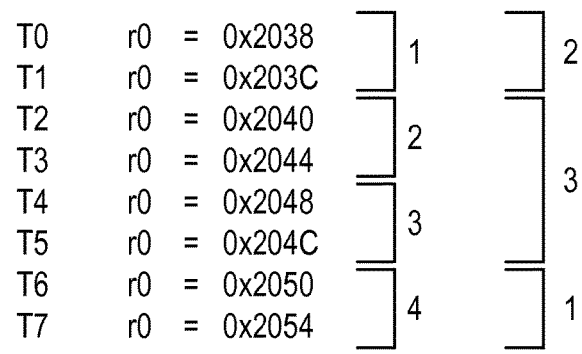
FIG. 5 shows two ways of splitting a group of eight threads and how the number of access requests changes depending on how the split is made.

FIG. 5 shows the content of register r0 for threads T0 to T7 shown in FIG. 2. The contents of register r0 correspond to memory addresses in the memory 90 that are accessed by each of threads T0 to T7. The addresses shown in FIG. 5 are hexadecimal.

In the data processing apparatus 10 of the present embodiment, only a subset of the threads may be executed at a time (i.e. substantially in parallel). In this particular example, only a set of m threads (i.e. four threads) from threads T0 to T7 can be processed by the memory load/store unit 80 at once. Accordingly, it is necessary to split the eight threads (T0 to T7) into two sets. It will be appreciated that there are many ways in which the eight threads may be divided into two sets of m threads. However, some divisions may be more efficient than others, since each access request can only be made to a single cache line. Hence, if the threads relating to a single cache line are split across two sets of m threads, then that single cache line may be accessed twice unnecessarily.

For example, consider the situation shown in FIG. 3 in which each cache line is 16 bytes in length. If the first four threads (T0 to T3) are selected to form a first set, and the second four threads (T4 to T7) are selected to form a second set of threads, then it will be necessary for a total of four memory access requests to be issued. This is because when the first set of threads T0 to T3 are handled, the addresses referred to by threads T0 and T1 lie on a first cache line (extending from memory address 0x2030 to memory address 0x203F), whilst threads T2 and T3 refer to memory addresses that lie on a second cache line (extending from memory addresses 0x2040 to memory address 0x204F). Since each access request causes a single cache line to be accessed, it is necessary for two memory accesses to be issued in order to access all of the addresses referred to by threads T0 to T3.

A similar situation arises when threads T4 to T7 are handled. That is, threads T4 and T5 refer to memory addresses that lie on one cache line (again extending from memory address 0x2040 to memory address 0x204F), whilst threads T6 and T7 refer to memory addresses lying on a still further cache line (extending from memory address 0x2050 to memory address 0x205F).

Consequently, when the threads are split up in this manner, it is necessary for the memory load/store unit 80 to issue a total of four memory access requests in order to retrieve the memory locations referred to by threads T0 to T7.

However, if the threads T0 to T7 are divided differently, then it is possible to reduce the number of memory access requests that must be issued by memory load/store unit 80. For example, if threads T0 to T7 are split such that a first set comprises threads T2, T3, T4 then only a single access request needs to be issued because all of those threads refer to addresses stored on the same cache line (extending from memory address 0x2040 to memory address 0x204F). The remaining threads, T0, T1, T6 and T7 then form a second set and can be serviced by two access requests as previously discussed.

Hence, by dividing the eight threads into two sets in a particular way, it is possible to reduce the number of access requests that must be issued by the memory load/store unit 80.

Figure 6A:
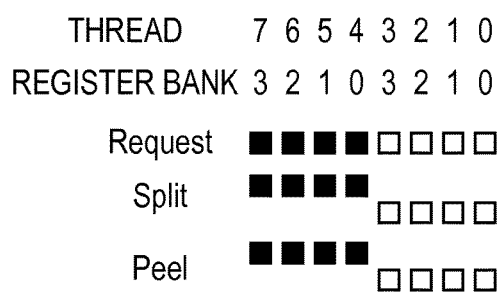
FIG. 6A shows, diagrammatically, a simple example of splitting and peeling a group of eight threads.
Figure 6B:
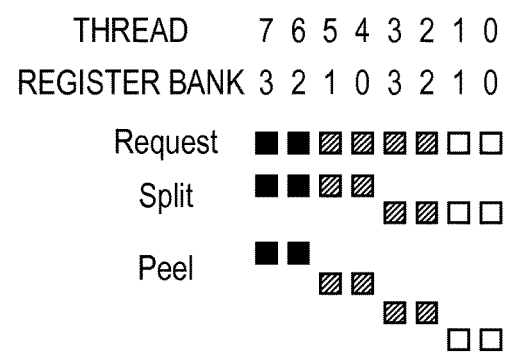
FIG. 6B show the first way of splitting up the eight threads shown in FIG. 5 such that four access requests must be issued.
Figure 6C:
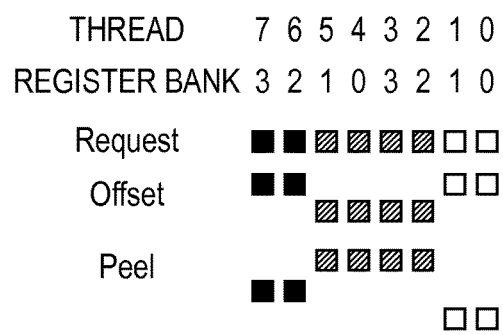
FIG. 6C shows the second way of splitting up the eight threads shown in FIG. 5 such that only three access requests must be issued.

The different ways of dividing up the threads into sets is also shown diagrammatically with respect to FIGS. 6A to 6C.

In FIG. 6A, it is shown how a set of eight threads (0 to 7) can be separated into two sets (a first set comprising threads 0 to 3 and a second set comprising threads 4 to 7). It is assumed in this example that threads 0 to 3 refer to memory addresses that lie on a single cache line and threads 4 to 7 refer to memory addresses that lie on a second cache line. Accordingly, when peeling takes place, it is only necessary to issue a single memory access request in respect of threads 0 to 3 and a single memory access request in respect of threads 4 to 7.

FIG. 6B considers the situation shown in FIG. 5, in which threads 0 and 1 refer to memory addresses that lie on one cache line, threads 2 to 5 refer to memory addresses that lie on a second cache line, and threads 6 to 7 refer to memory addresses that lie on a third cache line. Accordingly, when the threads are split (i.e. divided) into two sets (a first set made up of threads 0 to 3 and a second set made up on threads 4 to 7), each set of threads relates to memory addresses that lie on two different cache lines. Accordingly, the peeling process causes four memory access requests to be issued—a first request in respect of threads 0 and 1, a second request in respect of threads 2 and 3, a third request in respect of threads 4 and 5, and a fourth request in respect of threads 6 and 7.

FIG. 6C illustrates the method of dividing (i.e. splitting) the eight threads into two sets of four threads such that a smaller number of memory access requests can be issued by the memory load/store unit 80. In this case, an "offset split" occurs, which causes at least one of the two sets of threads to be made up of non-contiguous threads (i.e. "offcuts"). That is the threads are split into two sets based on a split point. In this case, the split point is associated with thread 2, and accordingly, thread 2 and the (m−1) threads following thread 2 are allocated into a single set of threads. In particular, a first set of threads is formed from threads 2, 3, 4 and 5, which can be satisfied by a single memory access request. The remaining threads (0, 1, 6, and 7) form a second set of threads, which require two access requests to be issued as discussed with respect to FIG. 5 above. This division of threads into sets causes threads that refer to memory addresses lying on a single cache line to be handled at the same time, and thereby reduces the number of memory access requests that must be issued.

Figures 7A, 7B:
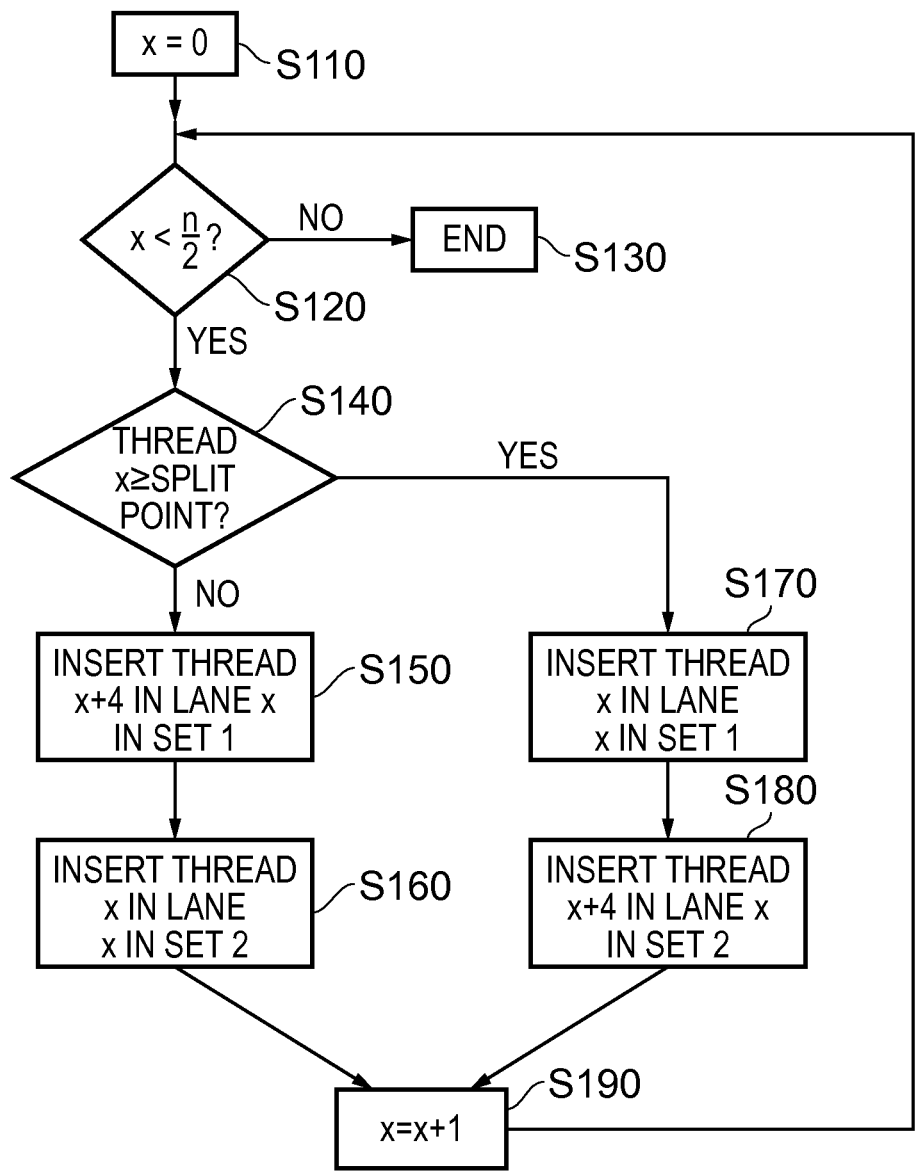
FIG. 7A is a flowchart indicating how a group of n threads may be turned into two sets of m threads using a split point.
FIG. 7B shows an assignment of eight threads to two sets of four threads using the flowchart of FIG. 7A.

FIG. 7A is a flowchart illustrating how a group of n threads may be separated into two sets using a split point, with each set being executed substantially in parallel in different iterations. The example of FIG. 7A therefore assumes the memory load/store unit 80 comprises four lanes, and can therefore handle the memory access requests of four threads substantially simultaneously. In other words, in this embodiments, m=4. Consequently, for a set of n threads, the threads will be divided into two sets of threads, each comprising m (i.e. 4) threads.

The flowchart begins at step S110 in which a variable x is initialised to 0. At step S120, it is determined whether x is less than n/2. That is, it is determined whether x is less than half of n. In other words, in this step, it is determined whether or not x is less than m. If this is false, the allocation of the n threads into sets of m threads is complete and the process ends at step S130. Otherwise, the flowchart continues to step S140 where it is determined whether thread number x is greater than or equal to the split point. The split point is used to determine how the n threads are allocated to the different sets and a method of determining where the split point is will be discussed later in respect of FIG. 9A. If thread number x is not greater than or equal to the split point then the flowchart continues to step S150 where thread number x+4 is inserted into lane x for set 1. The flowchart then continues to step S160 where thread x is inserted into lane x in set 2. The flowchart then continues to step S190. Alternatively, if thread x is greater than or equal to the split point in step S140, then the flowchart continues to step S170 where thread number x is inserted into lane x in set 1. The flowchart then continues to step S180 where thread x+4 is inserted into lane x in set 2. The flowchart continues to step S190. At step S190, the variable x is incremented by one and flow returns to step S120 where x is again tested to determine whether it is less than n/2.

FIG. 7B shows the distribution of eight threads (0 to 7) into two different sets of threads along with how the threads in each set are distributed between four lanes (0 to 3). This distribution assumes that the split point corresponds to thread 2 as is the case with FIG. 6C. Accordingly, as with FIG. 6C, it can be seen that threads 4, 5, 2 and 3 are allocated into a first set of threads and are therefore handled substantially in parallel by the memory load/store unit 80. Then, threads 0, 1, 6 and 7 are allocated into a second set of threads that are again handled in parallel as shown in FIG. 6C.

Figures 8A, 8B:
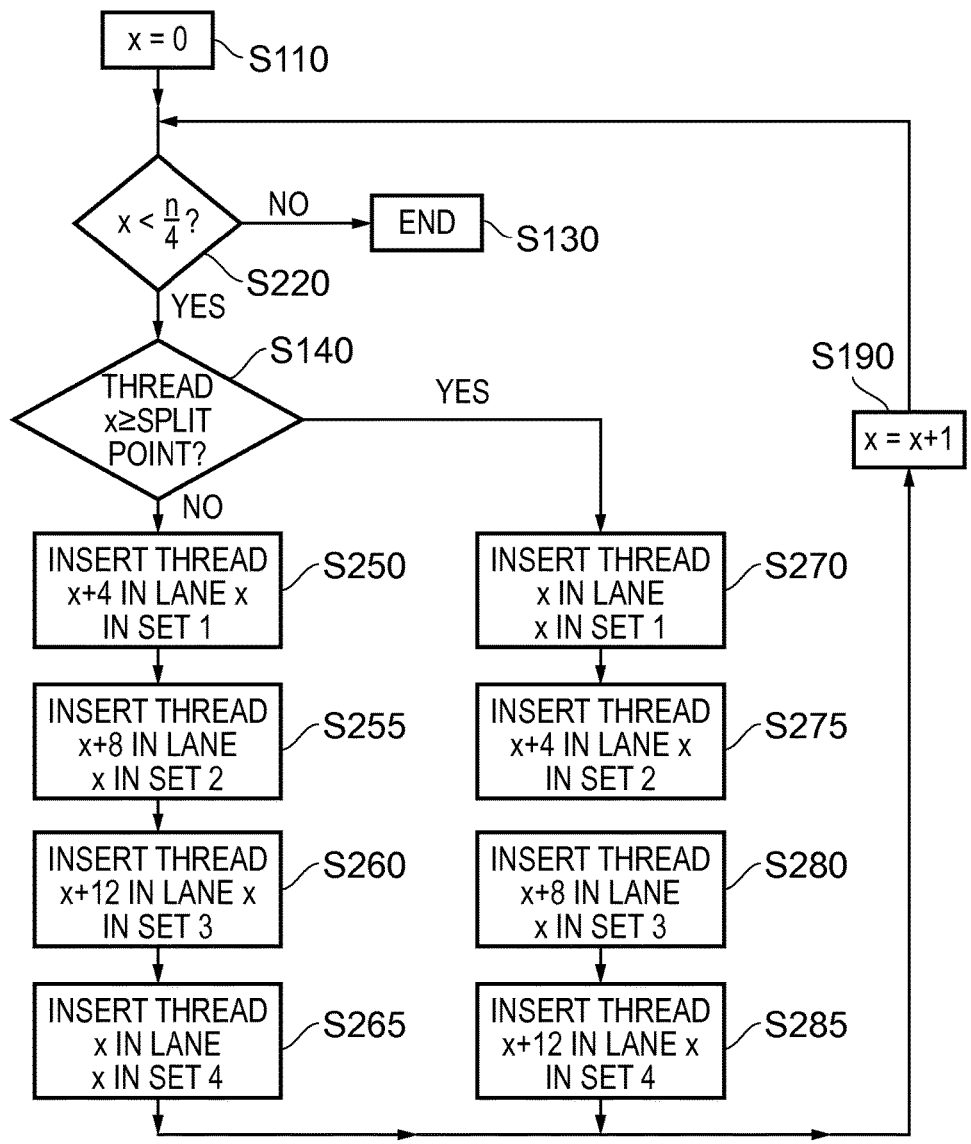
FIG. 8A is a flowchart indicating how a group of n threads may be turned into four sets of m threads using a split point.
FIG. 8B shows an assignment of sixteen threads into four sets of four threads using the flowchart of FIG. 8A.

FIG. 8A shows a second example in which a group of 16 threads (0 to 15) is distributed across four different sets. The same reference numerals, as compared to FIG. 7A, have been used where the step of the flowchart remains identical to that of FIG. 7A.

At step S220, it is determined whether or not x is less than n/4. That is, it is determined whether x is less than a quarter of n (which is equal to m). If x is not less than a quarter of n, then the flowchart continues to step S130 as previously discussed. Alternatively, the flowchart proceeds to step S140. If it is determined at step S140 that thread x is not greater than or equal to the split point, then the flowchart continues to step S250. At step S250, thread number x+4 is inserted into lane x in set 1. Flow then continues to step S255 where thread number x+8 is inserted into lane x in set 2 and flow then continues to step S260 where thread x+12 is inserted into lane x in set 3. Flow then continues to step S265 where thread x is inserted into lane x in set 4. Flow then continues to step S190 as previously discussed. If, however, thread x is greater than or equal to the split point at step S140, then the flow proceeds to step S270 in which thread x is inserted into lane x in set 1. Flow then continues to step S275 in which thread x+4 is inserted into lane x in set 2. Flow then continues to step S280 where thread x+8 is inserted into lane x in set 3. Flow then continues to step S285 where thread x+12 is inserted into lane x in set 4. Flow then continues to step S190 as previously discussed.

FIG. 8B shows the distribution of the 16 threads (0 to 15) between the four different lanes (0 to 3) across the four different sets of threads. This distribution again assumes a split point at thread 2. In this distribution, set 1 comprises threads 4, 5, 2, and 3, set 2 comprises threads 8, 9, 6, and 7, set 3 comprises threads 12, 13, 10, and 11, and set 4 comprises threads 0, 1, 14, and 15.

It will be appreciated by the skilled person that the flowcharts shown in FIGS. 7A and 8A can be generalised to accommodate the division of any number of threads n into a particular number of lanes for different set sizes. In particular, step S120 or S220 may be generalised to check that x is less than the number of threads n divided by the number of sets, i.e. that x is less than m.

If the outcome of step S140 is false, i.e. if thread x is not greater than or equal to the split point, then a number of steps corresponding to the number of sets then follows. Each of these steps performs an insertion into lane x. In the first step, thread x+4 is inserted into lane x in a particular set. In each subsequent step until the final step, the thread that is inserted is increased by m as compared to the previous step. However, in the final step, thread x is inserted. In the example of FIGS. 7A and 8A there are four lanes and therefore at each step before the final step, the thread that is inserted into lane x increases by 4 as compared to the previous step.

If the outcome of step S140 is true, i.e. if thread x is greater than or equal to the split point, then a number of steps corresponding to the number of sets follows. In each step an insertion is made into lane x in a particular set. In the first step, thread x is inserted into lane x in a particular set. For each subsequent step, the thread that is inserted into lane x increases by m as compared to the previous step.

In each of the two cases above, each insertion of a thread occurs into a lane x of a particular set, starting with set 1 and increasing by 1 in each subsequent step.

It will be appreciated by the skilled person that the flowcharts of FIGS. 7A and 8A are merely illustrative regarding how the different threads are distributed between different lanes and sets of threads. The actual implementation may determine the distribution of threads to sets and lanes in a more parallelised manner.

Figures 9A, 9B:
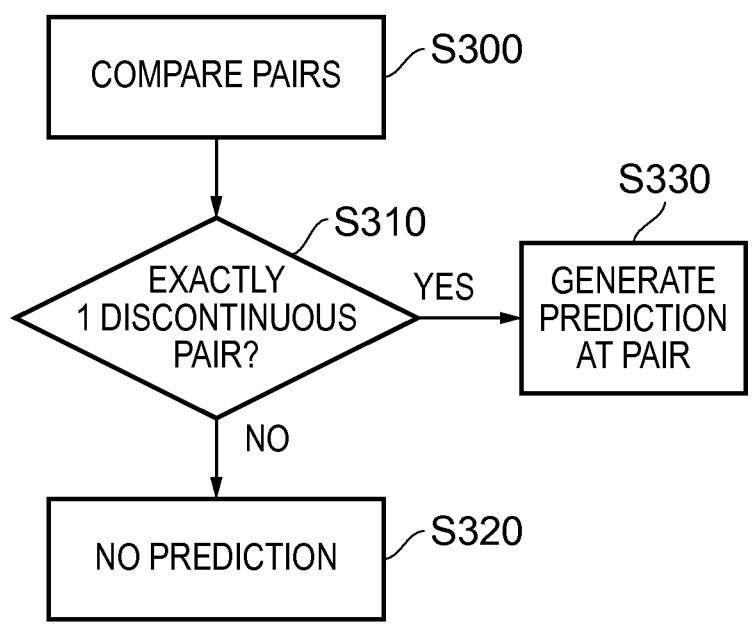
FIG. 9A shows a set of addresses and how the analysis of a particular bit of those addresses may be used to determine a split point.
FIG. 9B is a flowchart indicating when the predefined bit of the addresses of the threads may be used to generate a predicted split point.

FIG. 9A shows an example of how to determine a suitable split point. FIG. 9A shows the addresses accessed by threads T0 to T7 in FIG. 2. In FIG. 9A, the addresses have been translated from hexadecimal to binary. For a cache line of a given size, the cache line (storage) boundaries can be located by observing a change in value for a predefined bit of the address. In particular, when the cache lines are oft bytes, a change in cache line occurs when the value of bit number $\log_2(t)$ changes between adjacent pairs of addresses. FIG. 9A corresponds with the example situation shown in FIG. 3 in which each cache line is 16 bytes. Accordingly, the cache line (storage) boundaries can be located by observing a change in the value of bit number $\log_2(16)$, i.e. bit number 4, between adjacent pairs of addresses. Consequently, when bit number 4 changes between two consecutive memory address locations, it is indicative that the first of those two consecutive memory address locations will be stored in a different cache line to the second of those two consecutive memory address locations.

FIG. 9A groups addresses according to the similarity of bit number 4. It can be seen that, in this situation, three different cache lines must be accessed in total. The middle four threads access memory locations on the same cache line as is demonstrated graphically in FIG. 6C.

FIG. 9B is a flowchart illustrating how a split point may be predicted or selected. At step S300, the address referred to by each pair of contiguous threads in the first m of the n threads is analysed. That is, the method illustrated by the flowchart considers only the number of lanes in the processing circuitry 50 or the number of threads that can be processed at once by the processing circuitry 50. At step S310, it is determined whether or not there is exactly such "discontinuous pair" of threads in which the value of the predefined bit number varies. In the example of FIG. 9A, it would be determined whether or not there is exactly one pair of contiguous threads in the first m of the n threads in which bit number 4 varies. If there is not exactly one such discontinuous pair, then flow proceeds to step S310 and no prediction of a split point is made. If, at step S310, there is exactly one such pair, then flow proceeds to step S330 in which a split point is predicted to occur at that pair. In this example, the predicted split point corresponds with the second thread in the pair. It will be appreciated that this particular embodiment is concerned with attempting to reduce the number of memory access requests to 1 for each set of m threads. In other embodiments, it may be more acceptable to allow a larger number of memory access requests to be issued for sets of m threads. Accordingly, a prediction of a split point may sometimes be made even if more than one discontinuous pair exists.

In some embodiments, rather than not predicting a split point at step S320, the splitting circuitry 110 will instead "predict" a split point corresponding to thread 0. That is, no "offset split" occurs and instead the first m of the n threads are taken as the first set of m threads. This is especially useful when there are no discontinuous pairs in the first m of the n threads, i.e. when all of the addresses referred to by the m threads lie on the same cache line.

Figure 10:
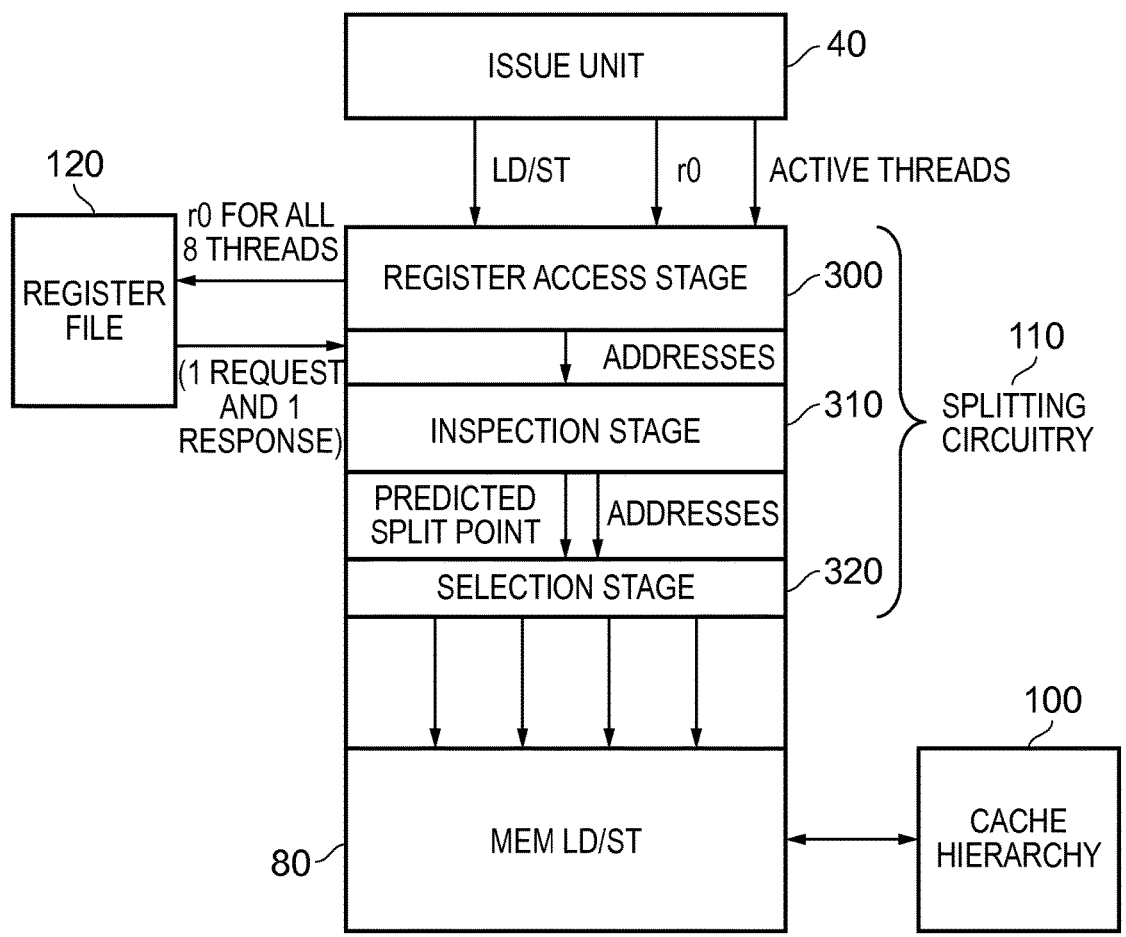
FIG. 10 shows, according to one embodiment, how a decoded instruction may be handled in the splitting circuitry.

FIG. 10 shows according to one embodiment, how a decoded instruction may be handled in the splitting circuitry. As previously discussed with reference to FIG. 1, the issue unit 40 issues one or more control signals to the memory load/store unit 80. These control signals may firstly go through splitting circuitry 110. In this example, the control signals comprise a first signal indicating whether the instruction is a load or store instruction, a second control signal indicating which register a memory address to be accessed is stored in, and a third control signal indicating the active threads, i.e. which of the n threads are executing the current instruction. It will be appreciated that the issue unit 40 may issue different or additional control signals to those shown.

The splitting circuitry 110 is illustrated as a sequence of pipelined stages 300, 310, 320. The control signals are firstly received at a register access stage 300. In this stage, the control signals are used to influence which registers are accessed or requested from the register file 120 for the n threads and therefore control what data is sent back from the register file 120 to the splitting circuitry 110. At the end of the register access stage, a set of memory addresses for the n threads is output to an inspection stage 310. During the inspection stage 310, it is determined where a suitable split point in the n active threads may be. This may be carried out, for example, using the method shown with regards to FIGS. 9A and 9B. The inspection stage then causes this predicted split point to be output along with the addresses to the selection stage 320. At the selection stage 320, the n threads are divided into sets of m threads using, for example, the method shown in FIGS. 7A and 7B. For each set of m threads, control signals indicating the selected threads are sent to the memory load/store unit 80. The memory load/store unit 80 is thereby able to issue one or more access requests to the cache hierarchy 100. Note that a single control signal may be used to indicate all the different sets of m threads. Alternatively, different control signals may be used to indicate each set of m threads.

In FIG. 10, a single request is sent to the register file 120 during the register access stage 300 in relation to all n active threads. Accordingly, during the inspection stage 310 and the selection stage 320, it is possible for any of the n threads to be sent to the memory load/store unit 80. However, this necessitates a register file 120 that is able to return all of the requested addresses at once. In practice, a register file 120 may not be able to access data values in registers corresponding to all of the threads simultaneously, and hence multiple register read cycles may be needed at this stage.

Figure 11:
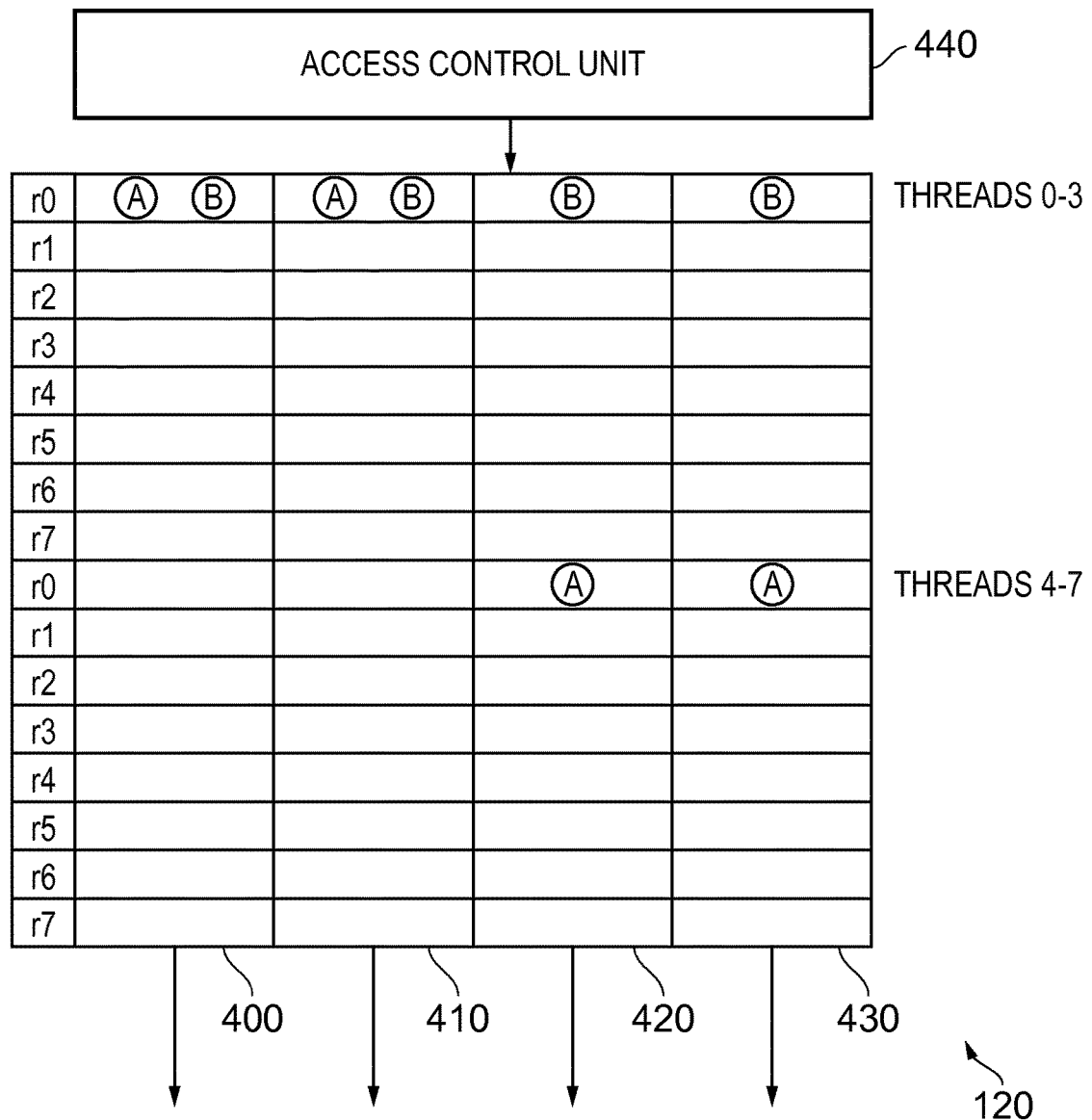
FIG. 11 shows a representation of the register banks that make up a register file.

For example, FIG. 11 illustrates one way of storing registers r0 to r7 for threads 0 to 7. In this example, access to four register banks 400, 410, 420 and 430 is controlled by an access control unit 440. Each of the register banks 400, 410, 420 and 430 stores registers r0 to r7 for two of the threads 0 to 7 and comprises a single output port. For example, memory bank 400 stores registers r0 to r7 for threads 0 and 4, register bank 410 stores registers r0 to r7 for threads 1 and 5, register bank 420 stores registers r0 to r7 for threads 2 and 6, and register bank 430 stores registers r0 to r7 for threads 3 and 7. The access control unit 440 ensures that, for a particular register of a particular thread, the correct register bank is accessed.

However, only a single register in each register bank may be accessed in a single cycle. Accordingly, in this example, it is not possible for registers from all threads 0 to 7 to be output simultaneously, because doing so would involve accessing and outputting two registers from a single register bank during one cycle. Instead, it may be possible to access register r0 from threads 0, 1, 6 and 7 during one cycle A. Alternatively, it may be possible to access register r0 from threads 0 to 3 in one cycle B. Other possible combinations will be apparent to the skilled person.

Figure 12:
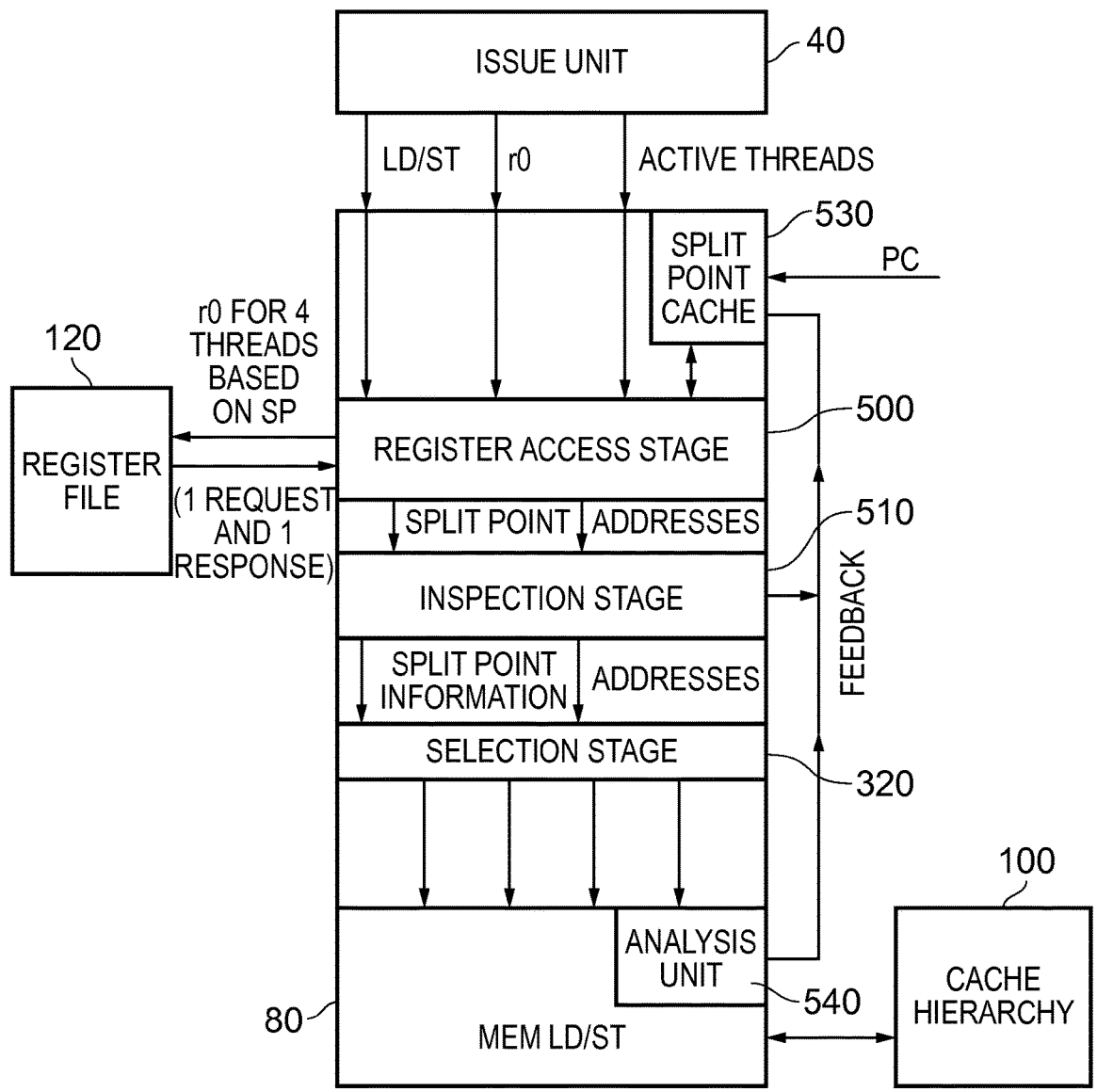
FIG. 12 shows, according to a second embodiment, how a decoded instruction may be handled in the splitting circuitry.

FIG. 12 shows according to a second embodiment, how a decoded instruction may be handled in the splitting circuitry in order to overcome the aforementioned limitation in relation to the register banks. In FIG. 12, the splitting circuitry 110 comprises a split point cache 530. During the register access stage 500, communication is made with the split point cache 530, which stores previously determined split points in association with program counter values. Consequently, it is possible for the register access stage 500 to determine, for the current program counter value, a split point which was previously found to produce a small number of access requests.

A split is performed based on the split point returned from the split point cache 530 (or using a split point corresponding with thread number 0 in the event that there was no hit in the split point cache 530), and the register access stage 500 then accesses addresses from the register file 120 for each set of m threads, starting with the m threads immediately following the split point. Accordingly, there is no need for the register file 120 to access registers corresponding to all n threads at once. The register access stage 500 then passes to the inspection stage 510 the addresses determined from the register file 120 and the split point returned from the split point cache 530 if any. In the event that no value was returned from the split point cache 530, then the inspection stage 510 operates as previously discussed with reference to FIG. 10 to attempt to generate a predicted split point. Note that a split has already occurred and that this predicted split point is merely used to determine whether a different split point might have been used. The inspection stage 510 then passes split point information together with the addresses returned from the register file 120 to the selection stage 320. The split point information may include the value returned from the split point cache (if any) and/or an indication of the predicted split point (if one was made). The split point information is provided to the analysis unit 540 for analysis to take place—either on the split point returned from the split point cache 530 or the predicted split point if a prediction was made. The selection stage 320 therefore merely issues, to the memory load/store unit 80, one or more control signals indicating the set of m threads and the addresses determined from the register file 120 for that set of m threads.

The analysis unit 540 is used to monitor the number of access requests that are issued to the cache hierarchy 100 and to issue feedback to the split point cache 530. The analysis unit 540 may be configured to either populate the split point cache 530 if it is determined that a predicted split point might result in a small number of memory access requests being issued, or to remove an entry from the split point cache 530 if using that entry resulted in a large number of memory access requests being issued.

For example, consider the case in which a miss occurred in the split point cache 530 and a predicted split point was subsequently generated. Although, in this case, the predicted split point is not used to perform the split, it may be determined that, had the predicted split point been used, only a small number of memory access requests would have had to have been issued. Consequently, that predicted split point value may be added to the split point cache 530 in conjunction with the current program counter value.

Alternatively, or in addition to the above, the feedback issued by the analysis unit 540 may be used to affect a confidence value in the split point cache 530, the confidence value indicating how certain it is that a particular split point will produce an efficient division of the n threads into sets of m threads such that a small number of access requests are generated.

An example system for providing such a confidence value may be providing a 2-bit confidence encoding which corresponds to the following sets of states: INVALID, SPECULATIVE, CONFIRMED, and NEGATIVE.

The INVALID state is the state for entries that are not in use. In other words, entries that are marked as INVALID may not be returned by the cache.

The SPECULATIVE state is used as the default state for entries as they are placed into the cache.

The CONFIRMED state is used for entries that started as SPECULATIVE and have proven to be usable. In particular, if an access request to the split point cache 530, then a SPECULATIVE value may be returned. If that SPECULATIVE value is used, and causes exactly one memory access request to occur, then the SPECULATIVE entry may be marked as CONFIRMED. Conversely, if a CONFIRMED entry is hit and subsequently causes an excess number of memory access requests to occur (e.g. more than one) then the state of that entry may be changed back from CONFIRMED to SPECULATIVE.

The NEGATIVE state indicates an entry where an offset split has been proven to be unhelpful. In other words if a SPECULATIVE entry in the cache is hit, and its use results in more than one memory access request being issued, then the state of that entry will be set to NEGATIVE.

Entries marked as NEGATIVE are not considered to be genuine entries in the cache. In other words, a "hit" on an entry of the cache where the state is marked as NEGATIVE is equivalent to a cache miss and results in a split point of 0 being used. However, keeping the NEGATIVE entry in the cache helps prevent a looping behaviour in which non-working predictions are continually, added, tested, and removed from the cache.

Figure 13:
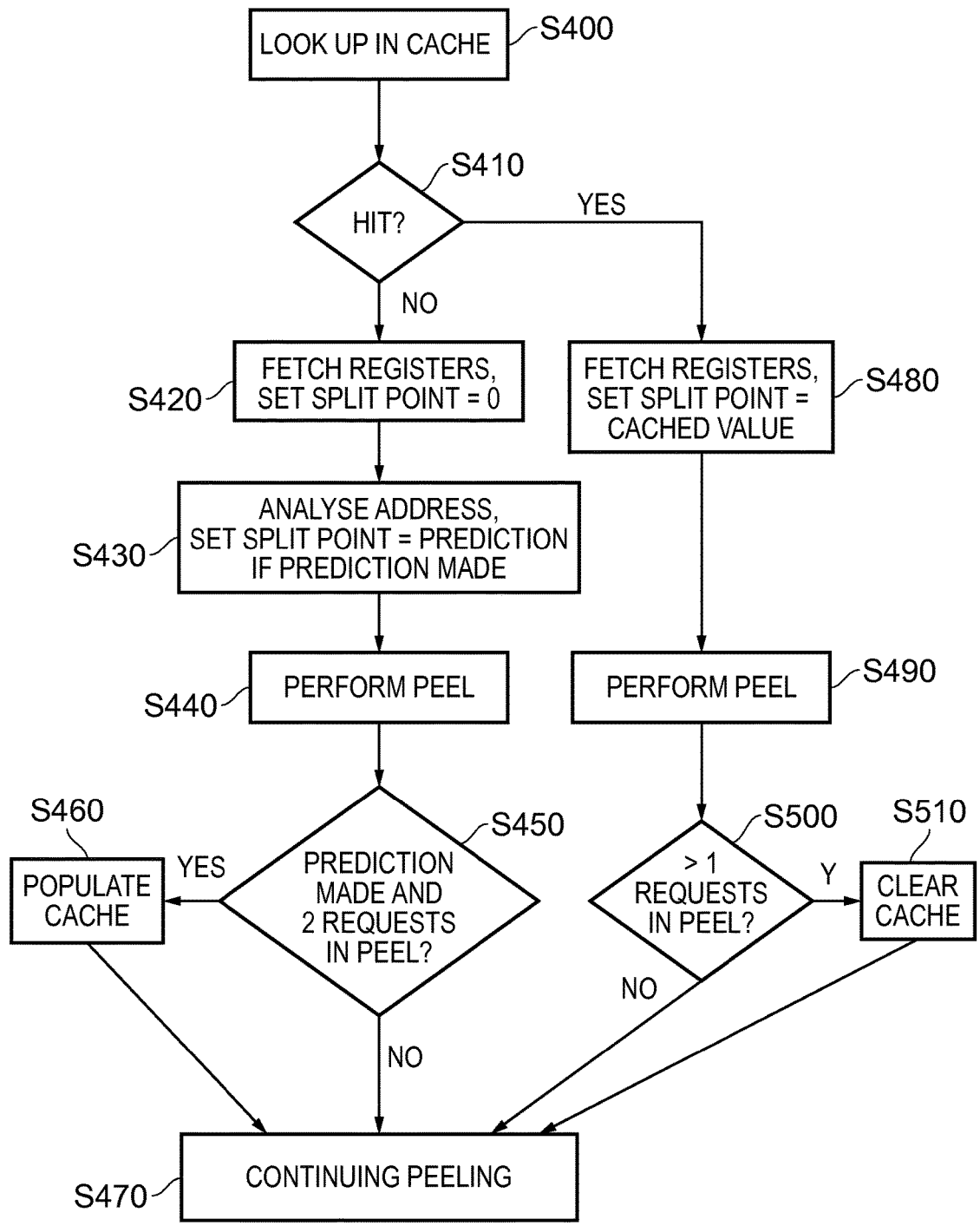
FIG. 13 is a flowchart indicating a method of using a split point cache.

FIG. 13 is a flowchart that illustrates the method of using the split point cache 530.

At step S400, a lookup is made in the split point cache 530 to determine whether or not there is a split point associated with the current program counter value. At step 410, it is determined whether or not a hit occurs in the split point cache 530. If a hit does not occur then at step S420, the split point is set to zero and a split is made. Registers are then fetched from the register file 120 for the first set of m threads. Then at step S430, the relevant bit of the addresses returned from the register file 120 are analysed (as previously described with reference to FIGS. 9A and 9B). As discussed earlier, under certain conditions this step will therefore cause a predicted split point to be generated. At step S440, the first peeling process is performed. That is, the memory load/store unit 80 issues memory access requests for the first set of m threads. In step S450, it is determined whether or not the split point cache 530 should be populated with the predicted split point (if any). In particular, if a split point was predicted and if exactly two access requests were issued during the peeling process performed in step S440, then the split point cache 530 is populated with that predicted split point. The issuing of exactly two access requests is suggestive that the addresses referred to by those m threads cross a cache line boundary. Accordingly, using the predicted split point in the future to divide the n threads between sets of m threads may cause an alignment of addresses to the cache line boundaries and thereby reduce the number of access requests that must be issued. If, at step S450, it is determined that no prediction was made at step S430, or if more than 2 access requests were issued, then flow simply proceeds directly to step S470 where the peeling process is continued for the remaining sets of m threads, accessing the registers for each set of m threads as necessary.

If there was a hit at step S410, then flow proceeds to step S480 where the split point is set to the value returned from the split point cache 530. The split is performed and registers are returned from the register file 120 for the first m threads following the split point out of the n threads. Then at step S490 the peeling process is carried out for the first set of m threads following the split point. Flow then continues to step S500 where it is determined whether or not more than one memory access request was issued during the peeling process. If more than one request was issued in the peeling process of step S490 then this is suggestive that the split point acquired from the split point cache has proven to be inefficient (since more than one access request was issued as a result of using that split point). Accordingly, at step S510, that entry in the split point cache is cleared (i.e. removed from the cache) and flow proceeds to step S470. If more than one request was not issued in the peeling process of step S490, then flow directly proceeds to step S470. At step S470, the peeling process is continued for the remaining sets of m threads, accessing the registers for each set of m threads as necessary.

Accordingly, the system stores efficient split points in the split point cache 530 based on predictions that have been previously carried out. Split points that turn out to be inefficient are removed so that they are not used in the future. As previously discussed, rather than simply removing a split point from the split point cache, a confidence value may be provided that indicates a confidence that a particular split point will produce a small number of access requests. Entries in the cache whose confidence value falls below a particular threshold may be removed from the cache. Alternatively, such entries may be left in the cache in order to prevent a looping behaviour in which the same prediction is continually made, tested, determined to be bad, deleted, and so on. In the scheme mentioned previously, non-working entries are marked as NEGATIVE in order to help prevent such looping behaviour.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus for executing an access instruction for n threads in order to access data values for the n threads, the data processing apparatus comprising:
   storage circuitry configured to store data values associated with the n threads in groups defined by storage boundaries;
   processing circuitry configured to process the access instruction for a set of threads at a time, where each set of threads comprises fewer than n threads; and
   splitting circuitry configured, responsive to the access instruction, to divide the n threads into multiple sets of threads, and to generate at least one control signal identifying the multiple sets;
   wherein:
   for each of the sets of threads, the processing circuitry is configured to be responsive to the at least one control signal to issue at least one access request to the storage circuitry in order to access the data values for that set of threads; and
   the splitting circuitry is configured to determine a split point in the n threads based on the storage boundaries;
   each set of threads comprises m threads and m<n;
   the splitting circuitry is configured to determine into which set of m threads each of the n threads is allocated based on the split point;
   the splitting circuitry is configured to allocate, into one of the sets of m threads, m consecutive threads from the n threads starting from a thread neighboring the split point; and
   the n threads are ordered corresponding to an order of locations of the data values in the storage circuitry.

2. A data processing apparatus according to claim 1, wherein the splitting circuitry is configured to determine into which set each of the n threads is allocated in order to seek to reduce a total number of access requests issued by the processing circuitry when processing the access instruction for the n threads.

3. A data processing apparatus according to claim 2, wherein the splitting circuitry is configured to determine into which set each of the n threads is allocated in order to seek, for at least one set, to issue exactly one access request to the storage circuitry.

4. A data processing apparatus according to claim 1, wherein the storage circuitry comprises at least one cache and the storage boundaries are defined by cache line boundaries.

5. A data processing apparatus according to claim 4, wherein the splitting circuitry is configured to determine into which set each of the n threads is allocated in order to seek, for at least one set of threads, to allocate to that set threads whose data values reside in exactly one cache line of the at least one cache.

6. A data processing apparatus according to claim 1, wherein the splitting circuitry is configured to allocate, into one of the sets of m threads, one or more threads immediately preceding a thread associated with the split point and one or more threads immediately following a further set of m consecutive threads.

7. A data processing apparatus according to claim 1, wherein the at least one control signal comprises data corresponding to the split point.

8. A data processing apparatus according to claim 1, wherein for each of the n threads, each instruction provides an address of a location in the storage circuitry where the data value for that thread is located;
wherein the splitting circuitry is configured to predict a split point based on a value of a predefined bit of the address provided for at least a subset of the n threads.

9. A data processing apparatus according to claim 8, wherein each of the n threads has an associated identifier and the threads are ordered according to the associated identifier; and
wherein a thread 0 has a lowest identifier.

10. A data processing apparatus according to claim 9, wherein, for each thread, the address of the location in the storage circuitry where the data value for that thread is located increases in dependence on the associated identifier for that thread.

11. A data processing apparatus according to claim 9, wherein a predicted split point is initially associated with the thread 0.

12. A data processing apparatus according to claim 9, wherein the splitting circuitry is configured to predict the split point by comparing the predefined bit in the address provided for adjacent pairs of threads.

13. A data processing apparatus according to claim 12, wherein, in response to determining that no adjacent pair formed from the first m of the n threads provides addresses having different predefined bits, the splitting circuitry is configured to predict the split point as associated with the thread 0.

14. A data processing apparatus according to claim 12, wherein, in response to determining that exactly one adjacent pair formed from the first m of the n threads provides addresses having different predefined bits, the splitting circuitry is configured to predict the split point as associated with one of the threads in the exactly one adjacent pair.

15. A data processing apparatus according to claim 12, wherein, in response to determining that more than one adjacent pair formed from the first m of the n threads provides addresses having different predefined bits, the splitting circuitry is configured to predict the split point as associated with the thread 0.

16. A data processing apparatus according to claim 1, wherein the splitting circuitry comprises a split point cache; and
wherein the splitting circuitry is configured to determine the split point based on the split point cache.

17. A data processing apparatus according to claim 16, wherein the split point cache has a number of entries each of which is configured to store a split point in association with a program counter value.

18. A data processing apparatus according to claim 16, wherein the split point cache is populated based on the number of access requests issued to the storage circuitry in order to access, for each of the sets of m threads, the data values for those m threads.

19. A data processing apparatus according to claim 18, wherein in the absence of a hit being detected in the split point cache, the splitting circuitry is configured to associate the split point with thread 0 when allocating the n threads into the multiple sets of m threads and when generating the at least one control signal for each set;
for a first set the splitting circuitry is configured to predict the split point based on a value of the predefined bit of the address; and
wherein an entry in the split point cache is populated with the predicted split point if the number of access requests issued by the processing circuitry in order to access the data values for that first set is consistent with the predicted split point.

20. A data processing apparatus according to claim 19, wherein the split point cache is populated if exactly two access requests are issued to the storage circuitry in order to access, for the first set of m threads, the data values for those m threads.

21. A data processing apparatus according to claim 16, wherein each entry in the split point cache is configured to store a confidence value in association with a split point stored in that entry.

22. A data processing apparatus according to claim 16, wherein the splitting circuitry comprises feedback circuitry configured to adjust the confidence value for a particular split point based on the at least one access request.

23. A data processing apparatus according to claim 1, wherein the data processing apparatus is configured to execute access instructions for one or more thread groups each comprising one or more threads; and
wherein one of the thread groups comprises the n threads.

24. A data processing method for executing an access instruction for n threads in order to access data values for the n threads, wherein the data values for the n threads are stored in groups defined by storage boundaries, the data processing method comprising the steps:
dividing the n threads into multiple sets of threads, wherein each set of threads comprises m threads and m<n;
generating at least one control signal identifying the multiple sets;
for each of the sets of threads, issuing in response to the at least one control signal at least one access request in order to access the data values for that set of threads;
determining a split point in the n threads based on the storage boundaries;
determining into which set of m threads each of the n threads is allocated based on the split point;
allocating, into one of the sets of m threads, m consecutive threads from the n threads starting from a thread neighboring the split point; and
the n threads are ordered corresponding to an order of locations of the data values in the storage circuitry.

25. A data processing means for executing an access instruction for n threads in order to access data values for the n threads, the data processing means comprising:
storage means for storing data values associated with the n threads in groups defined by storage boundaries;
processing means for processing the access instruction for a set of threads at a time, where each set of threads comprises fewer than n threads; and
splitting means for dividing, in response to the instruction, the n threads into multiple sets of threads, and for generating at least one control signal identifying the multiple sets,
wherein:
for each of the sets of threads, the processing means for issuing, responsive to the at least one control signal, at least one access request to the storage means in order to access the data values for that set of threads;

the splitting means is configured to determine a split point in the n threads based on the storage boundaries;

each set of threads comprises m threads and m<n;

the splitting means is configured to determine into which set of m threads each of the n threads is allocated based on the split point;

the splitting means is configured to allocate, into one of the sets of m threads, m consecutive threads from the n threads starting from a thread neighboring the split point; and the n threads are ordered corresponding to an order of locations of the data values in the storage means.

* * * * *